United States Patent
Nogami et al.

(10) Patent No.: US 8,559,675 B2
(45) Date of Patent: Oct. 15, 2013

(54) DRIVING SUPPORT DEVICE, DRIVING SUPPORT METHOD, AND PROGRAM

(75) Inventors: Tateaki Nogami, Kanagawa (JP); Yuki Waki, Osaka (JP); Kazuhiko Iwai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 148 days.

(21) Appl. No.: 13/147,730

(22) PCT Filed: Apr. 15, 2010

(86) PCT No.: PCT/JP2010/002742
§ 371 (c)(1),
(2), (4) Date: Aug. 3, 2011

(87) PCT Pub. No.: WO2010/122747
PCT Pub. Date: Oct. 28, 2010

(65) Prior Publication Data
US 2011/0293145 A1    Dec. 1, 2011

(30) Foreign Application Priority Data
Apr. 23, 2009  (JP) ................. 2009-105305

(51) Int. Cl.
*G06K 9/00* (2006.01)
*B60T 7/16* (2006.01)
*B60Q 1/00* (2006.01)

(52) U.S. Cl.
USPC ........... 382/106; 382/104; 382/107; 180/167; 180/168; 180/169; 340/435; 340/436

(58) Field of Classification Search
USPC .................. 382/104, 106, 107; 180/167–169; 340/435, 436
See application file for complete search history.

(56) References Cited

U.S. PATENT DOCUMENTS

| 5,612,686 A | 3/1997 | Takano et al. |
| 6,275,754 B1 * | 8/2001 | Shimizu et al. ................. 701/41 |
| 2005/0190260 A1 | 9/2005 | Xie |
| 2005/0273263 A1 * | 12/2005 | Egami et al. ................. 701/301 |

(Continued)

FOREIGN PATENT DOCUMENTS

| JP | 7-96806 | 4/1995 |
| JP | 8-178679 | 7/1996 |
| JP | 2004-142741 | 5/2004 |

(Continued)

OTHER PUBLICATIONS

European Search Report, dated Jul. 1, 2013.

*Primary Examiner* — Anand Bhatnagar
*Assistant Examiner* — Soo Park
(74) *Attorney, Agent, or Firm* — Greenblum & Bernstein, P.L.C.

(57) ABSTRACT

A driving support device includes an image-capturer that captures side rear images of a vehicle, a distance measurer that measures a distance between the vehicle and another vehicle, and a vehicle detector that detects the another vehicle in the captured images. A superimposed image generator calculates a distance of units of the vehicle length based on information concerning the vehicle length stored in a vehicle length information storage and the distance to the another vehicle detected by the distance measurer, and generates a superimposed image based on the calculated distance. A display image generator synthesizes the generated superimposed image on a side peripheral image including the captured side rear images, and displays the image on a display installed in a position at which the field of front vision of the driver is not obstructed.

13 Claims, 28 Drawing Sheets

(56) References Cited

U.S. PATENT DOCUMENTS

| | | | |
|---|---|---|---|
| 2007/0236563 A1* | 10/2007 | Takagi et al. | 348/64 |
| 2007/0290823 A1 | 12/2007 | Watanabe et al. | |
| 2009/0009314 A1* | 1/2009 | Taniguchi et al. | 340/461 |
| 2009/0121899 A1* | 5/2009 | Kakinami et al. | 340/932.2 |
| 2009/0265061 A1* | 10/2009 | Watanabe et al. | 701/36 |
| 2010/0274641 A1* | 10/2010 | Allen et al. | 705/13 |
| 2010/0283632 A1* | 11/2010 | Kawabata et al. | 340/932.2 |
| 2011/0137527 A1 | 6/2011 | Simon et al. | |

FOREIGN PATENT DOCUMENTS

| | | |
|---|---|---|
| JP | 2006-51850 | 2/2006 |
| JP | 2007-334566 | 12/2007 |
| JP | 2008-123215 | 5/2008 |
| JP | 2008-193339 | 8/2008 |
| WO | 2005/013235 | 2/2005 |

* cited by examiner

DRIVING SUPPORT DEVICE, DRIVING SUPPORT METHOD, AND PROGRAM

TECHNICAL FIELD

The present invention relates to a drive support apparatus, a driving support method, and a program. More particularly, the present invention relates to a drive support apparatus and a driving support method which present a driver with an image of a side rear area of a vehicle captured by a camera.

BACKGROUND ART

In recent years, as a camera technology advances and the cost decreases, various systems for supporting driving using a vehicle-mounted camera have been developed. Particularly, in a parking support system of a vehicle, by mounting a camera with a wide-angle lens, a driver can park a vehicle while checking an area including a rear blind spot which is difficult to see directly from the driver's seat.

Patent Literature 1 discloses a parking assist device that draws guide lines of a vehicle width in a moving direction (a backward direction) of a vehicle and displays a ladder-shaped diagram, in a superimposed manner, in which the guide lines are connected at intervals of a predetermined distance. The device disclosed in Patent Literature 1 displays an anticipated traveling locus in a superimposed manner, for example, according to a steering angle detected by a steering sensor.

In Patent Literature 2, as a technique of supporting driving at the time of lane change, disclosed is a drive support apparatus that displays a guide line (a transverse line traversing a monitor), in a superimposed manner, at a boundary position of a dangerous area, a caution area, or a safety area on a road surface, decided based on distance or relative speed.

Meanwhile, as another system using a vehicle-mounted camera, there is an electronic mirror system. The electronic mirror system displays, on a monitor inside a vehicle, a side rear image obtained by capturing a status of an area from the side to the rear (hereinafter referred to as "side rear") which has been conventionally checked by exterior rear view mirrors or the eyes. In the past, the driver has turned his/her neck or waste at a large angle to check the side mirror or check the side rear in the eyes. However, in the electronic mirror system, the driver can check the side rear by checking a display near the driver's seat. Further, by using the wide-angle lens and arranging the monitor near the field of front vision, even at the time of lane change, safety of the side rear can be checked by checking the electronic mirror near the field of front vision.

However, in the electronic mirror system, the side rear image displayed on the monitor is poorer in stereoscopic effect than a virtual image of the side rear seen through the side mirror, and it is difficult to measure the distance from a vehicle in an adjacent lane by merely displaying the captured image. At the time of lane change, it is necessary to instantly learn the presence and absence of vehicles in an adjacent lane, the distance from other vehicles, and the speed of other vehicles relative to the subject vehicle.

In Patent Literature 3, disclosed is a drive support apparatus that helps a driver to determine the distance by displaying a mark representing a degree of risk from a subject vehicle from the driver's point of view on the side rear image or a mark at the rear position of a predetermined distance. In the device disclosed in Patent Literature 3, it is possible to almost accurately recognize the distance from the subject vehicle to other vehicles by reading the mark that is displayed in a superimposed manner near other vehicles reflected on the side rear image when seeing the side rear image.

CITATION LIST

Patent Literature

PTL1
Japanese Patent Application Laid-Open No. 2004-142741
PTL2
Japanese Patent Application Laid-Open No. 2006-51850
PTL3
Japanese Patent Application Laid-Open No. 2007-334566

SUMMARY OF INVENTION

Technical Problem

However, the conventional drive support apparatuses have the following problems.

(1) In the device disclosed in Patent Literature 1, when it is applied to lane change during traveling, it is difficult to intuitively learn the distance from other vehicles by simply displaying the ladder-shaped diagram having a predetermined distance interval. For example, when a vehicle is present between a fifth compartment and a sixth compartment of the ladder shape display having an interval of 3 m, the driver needs to convert the distance, for example, 3 m (per vehicle)×4 (vehicles)=12 m. Further, since a distant vehicle that is at a predetermined distance or more from the rear end of the subject vehicle is hidden by the superimposed displayed diagram, it is difficult to recognize the presence of the vehicle.

(2) In the device disclosed in Patent Literature 2, in the side rear image captured at a wide angle, a lane passes in an oblique direction. Thus, it is difficult to understand a positional relationship between a vehicle and a guide line in the image through a guide line of a transverse straight line form, and it is difficult to intuitively learn the distance from other vehicles.

(3) In the device disclosed in Patent Literature 3, since the distance from the subject vehicle to other vehicles is displayed in units of meters, there has been a problem in that the driver is difficult to intuitively recognize the distance. For example, when trying to change a lane, even though the distance is displayed on a screen as 10 meters, it is difficult to intuitively judge whether or not the distance of 10 meters is the distance that allows a lane change to be performed directly behind the subject vehicle or whether or not there is some space and it is the distance that can allow a lane change.

In either case, the electronic mirror system has a problem in that distortion of an image is large and it is difficult to get a feeling of distance in exchange for advantage that the dead angle is removed by the wide-angle image. For example, when the driver tries to change a lane while traveling along an express highway, the driver needs to change a lane by seeing the side rear image displayed by the electronic mirror system and then judging whether or not a lane change is possible. At this time, even when a vehicle is reflected on the side rear image, it is difficult to instantly recognize how far other vehicles are behind from the subject vehicle or how fast other vehicles are approaching through the display of the simple side rear image.

It is an object of the present invention to provide a drive support apparatus, a driving support method, and a program through which the driver can more intuitively and accurately judge the distance to other nearby vehicles.

Solution to Problem

The drive support apparatus according to an embodiment of the present invention includes: an imaging section that captures a side peripheral image of a subject vehicle; a vehicle detecting section that detects other vehicles in the captured image; a distance detecting section that detects distances between the subject vehicle and the other vehicles; a subject vehicle length information storage section that stores the entire length of the subject vehicle as subject vehicle length information; a superimposed image generating section that calculates a distance of a subject vehicle length unit based on the subject vehicle length information stored in the subject vehicle length information storage section and distances to the other vehicles detected by the distance detecting section and generates a superimposed image based on the detected distance; a display image generating section that synthesizes the superimposed image generated by the superimposed image generating section on the captured side peripheral image and generates the display image; and a display section that is installed in the subject vehicle and displays the display image generated by the display image generating section.

A driving support method of the present invention includes a step of capturing a side peripheral image of a subject vehicle, a step of detecting other vehicles in the captured image, a step of detecting distances between the subject vehicle and the other vehicles, a step of storing the entire length of the subject vehicle as subject vehicle length information in advance, a step of calculating a distance of a subject vehicle length unit based on the subject vehicle length information and distances to the other vehicles and generating a superimposed image based on the detected distance, a step of synthesizing the generated superimposed image on the captured side peripheral image and generating the display image, and a step of displaying the generated display image.

Another aspect of the present invention provides a program causing a computer to execute the steps of the driving support method.

Advantageous Effects of Invention

According to the present invention, by visualizing the distance from other vehicles present in the image as distance information in which a subject vehicle length is used as a reference unit of a length, the driver can more intuitively learn the distance from other vehicles. Thus, the driver can learn the distance and the relative speed at the time of lane change more intuitively, rapidly and reliably. Further, the driver can intuitively learn the distance to other vehicles while checking a status of the side rear and can more reliably perform a lane change operation.

DESCRIPTION OF EMBODIMENTS

Hereinafter, embodiments of the present invention will be described in detail with reference to the accompanying drawings.

Embodiment 1

Figure 1:
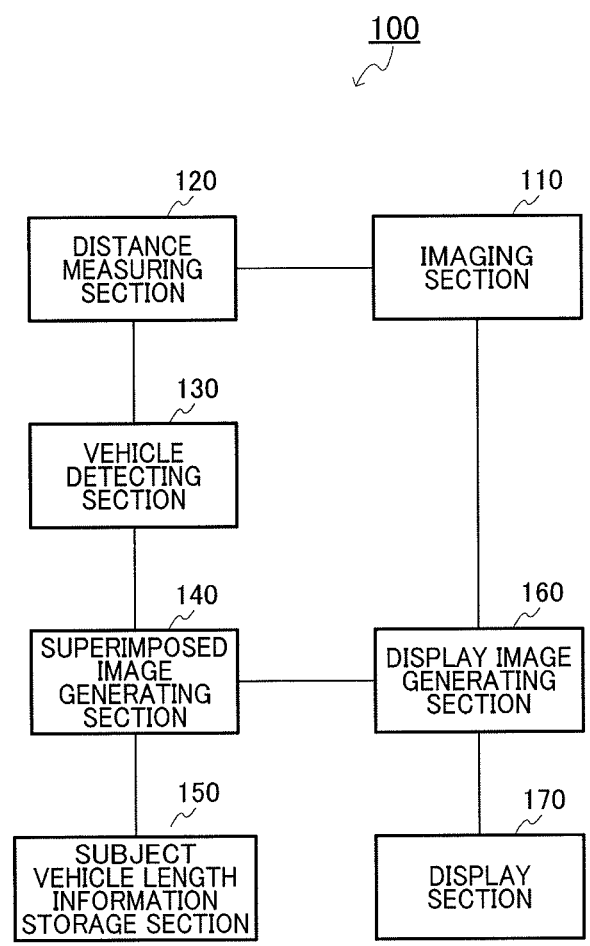
FIG. 1 is a block diagram showing a configuration of drive support apparatus according to Embodiment 1 of the present invention.

FIG. 1 is a block diagram showing a configuration of a drive support apparatus according to Embodiment 1 of the present invention. The present embodiment is an example in which an electronic mirror system that presents a driver with an image of a side rear area of a vehicle captured by a camera is applied.

As illustrated in FIG. 1, drive support apparatus 100 includes imaging section 110, distance measuring section 120, vehicle detecting section 130, superimposed image generating section 140, subject vehicle length information storage section 150, display image generating section 160, and display section 170.

Imaging section 110 is a stereo camera for visible light or infrared light for acquiring an image around a vehicle. Imaging section 110 horizontally reverses the side rear image of the captured image and then transfers the reversed side rear image to display image generating section 140 and distance measuring section 120 to be used as a base image of the electronic mirror system. An image sensor such as a charge coupled device (CCD) or a complementary metal oxide semiconductor (CMOS) is mainly used as an imaging system. Particularly, when a wide-angle lens is used, a captured image may be distorted. Imaging section 110 corrects such distortion. Since the imaging section is a stereo camera, two images are obtained by one imaging section, but any one of the images may be transferred to display generating section.

Distance measuring section 120 calculates the distance of each of the pixels inside an image based on a stereo image including two images captured by imaging section 110. As a distance measuring algorithm using a stereo image, sum of absolute difference (SAD) or sum of squared difference (SSD), normalized cross-correlation (NCC), or the like is used.

Vehicle detecting section 130 detects other vehicles present inside a distance image generated by distance measuring section 120 using an object detecting algorithm. In the case of a stereo camera, since there are known algorithms such as a method using disparity or a plane projection stereo method, the known algorithms may be used. Vehicle detecting section 130 detects a vehicle using the object detecting algorithm.

Superimposed image generating section 140 calculates a distance of a subject vehicle length unit based on subject vehicle length information stored in subject vehicle length storage section 150 and the distance to other vehicles and generates a superimposed image based on the calculated distance. The superimposed image is an image that is arranged and displayed on or around a peripheral image including the side rear image so as to help the driver to learn the distance.

Subject vehicle length information storage section 150 stores subject vehicle length information uniquely depending on a type of vehicle. The subject vehicle length information is information based on the vehicle length of the subject vehicle. The subject vehicle length information may be fixedly stored in advance or may be appropriately set by an input from the outside through an input interface. In the case of towing an object, the length including the towed object may be regarded as the subject vehicle length.

Display image generating section 160 generates an image that is to be displayed on display section 17 and finally viewed by the driver by synthesizing the superimposed image generated by superimposed image generating section 140 on the side rear image, which becomes the base, transmitted from imaging section 110.

Display section 170 is a display device or the like installed in the vehicle and displays an image generated by display image generating section 160. Display section 170 is installed at the position where the driver's field of front vision is not obstructed. As the display device, a liquid crystal display (LCD), a light-emitting display such as an organic electroluminescent display (OELD), a vacuum fluorescent display (VFD), a laser display, and a head-up display (HUD) in which an optical system and a combiner (a screen displaying virtual and actual images at the same distance) are combined with the above mentioned display devices may be used.

The above described functions are implemented by executing a control program through a microcomputer. That is, drive support apparatus 100 includes a central processing unit (CPU) as a controller, a read only memory (ROM) storing a control program, a random access memory (RAM) for execution of a program, a camera as an imaging device, and a display section as a display/alarm device, and the controller controls operations of the components of drive support apparatus 100. The components of FIG. 1 are illustrated as blocks for performing a driving support process executed by the controller.

An operation of drive support apparatus 100 having the above described configuration will be described below.

Figure 2:
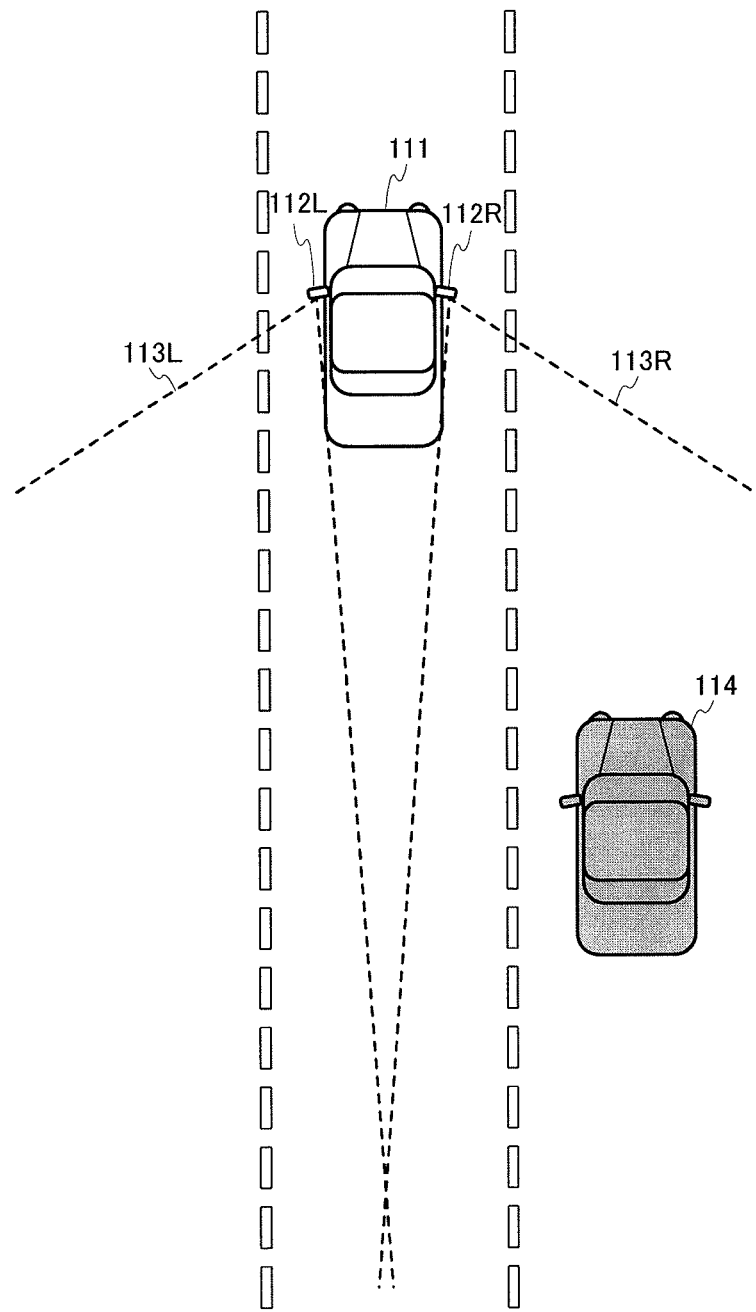
FIG. 2 shows a status around a subject vehicle in which drive support apparatus according to Embodiment 1 is mounted.

FIG. 2 shows a status around the subject vehicle in which drive support apparatus 100 is mounted.

As illustrated in FIG. 2, subject vehicle 111 includes cameras 112L and 112R installed on upper sections of exterior rear view mirrors toward the side rear direction. Cameras 112L and 112R correspond to imaging section 110 of drive support apparatus 100. Cameras 112L and 112R capture an image inside fields of view 113L and 113R of a camera. Inside fields of view 113L and 113R of a camera, another vehicle 114 is captured.

Subject vehicle 111 is traveling on a lane in the middle of a three-lane road in a state in which cameras 112L and 112R are installed at the side mirror position, and an image is being captured by cameras 112L and 112R in real time (for example, at 30 fps). The image captured by cameras 112L and 112R is processed in units of frames by a signal processing circuit (not shown) inside imaging section 110 and then presented to the driver by display section 170 near the driver seat via display image generating section 160. A series of processes in this state will be described with reference to FIG. 3.

Figure 3:
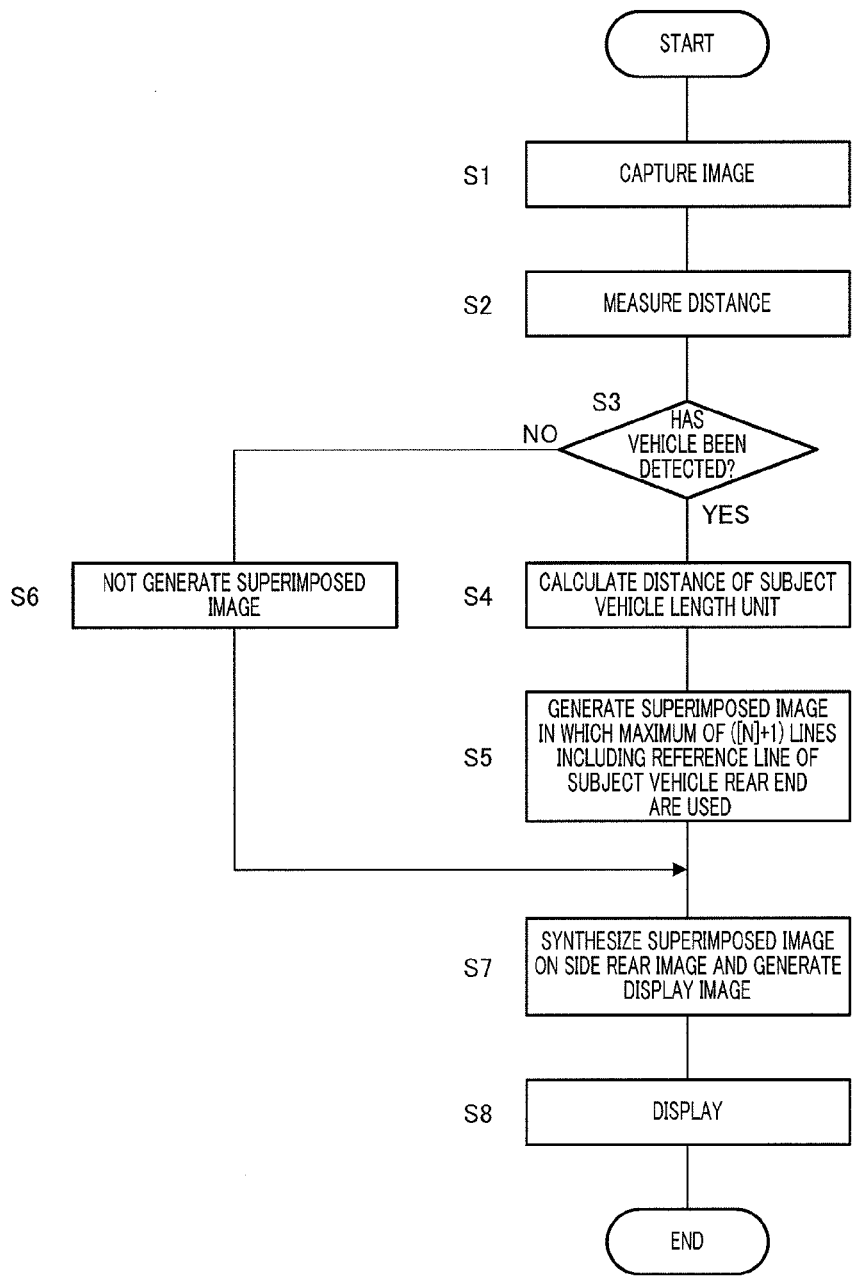
FIG. 3 is a flowchart showing an operation of drive support apparatus according to Embodiment 1.

FIG. 3 is a flowchart showing an operation of drive support apparatus 100. In FIG. 3, "S" denotes each step of the flow.

In step S1, cameras 112L and 112R, that is, imaging section 110 acquires the stereo image at set timing and transmits the stereo image to distance measuring section 120 and display image generating section 160. At this time, control of a gain according to the brightness of a field of view of imaging section 110 is performed. Particularly, when the wide-angle lens is used, since distortion of an image is large, correction of distortion according to an installation position, an angle of view, a direction, or the like of imaging section 110 may be performed.

In step S2, distance measuring section 120 measures the distance by generating the distance image based on the stereo image.

In step S3, vehicle detecting section 130 detects a vehicle (that is, another vehicle) based on the distance measuring result and checks whether or not a vehicle has been detected.

When another vehicle is not detected in the image, in step S6, superimposed image generating section 140 does not generate any superimposed image, and the process proceeds to step S7.

In step S7, display image generating section 160 synthesizes the superimposed image on the side rear image and generates the display image. Here, superimposed image generating section 140 does not generate any superimposed image. Display image generating section 160 synthesizes an output of superimposed image generating section 140 that has not generated anything with the side rear image. The result is the side rear image itself.

In step S8, display section 170 displays the side rear image "as it is", and then the present flow is finished.

Next, a description will be made in connection with an operation when the driver tries to perform a lane change to an adjacent right lane and another vehicle 114 in the adjacent lane is gradually approaching.

Even in this case, in step S1, imaging section 110 acquires the stereo image and transmits the stereo image to distance measuring section 120 and display image generating section 160. In step S2, distance measuring section 120 measures the distance, and in step S3, vehicle detecting section 130 detects a vehicle. In this case, vehicle detecting section 130 detects another vehicle 114 illustrated in FIG. 2, and the process proceeds to step S4.

In step S4, superimposed image generating section 140 calculates the distance of the subject vehicle length unit based on the subject vehicle length information stored in subject vehicle length information storage section 150 and the distance to another vehicle. For example, if d1 [m] is defined as the distance from camera 112R to the vehicle's rear end, d2 [m] as the distance to another vehicle, and L [m] as the subject vehicle length, the approximate distance D of the subject vehicle length unit from the subject vehicle's rear end to another vehicle is represented by the following equation 1.

$$D=(d2-d1)/L \quad \text{(Equation 1)}$$

In step S5, superimposed image generating section 140 generates the superimposed image using the distance D. Specifically, the superimposed image in which a maximum of ([N]+1) lines including a reference line of the subject vehicle's rear end are used is generated.

In step S7, display image generating section 160 synthesizes the superimposed image generated by superimposed image generating section 140 on the side rear image transmitted from imaging section 110 and generates the display image.

In step S8, display section 170 displays the display image in which the superimposed image is synthesized on the side rear image, and then the present flow is finished.

Figure 4:
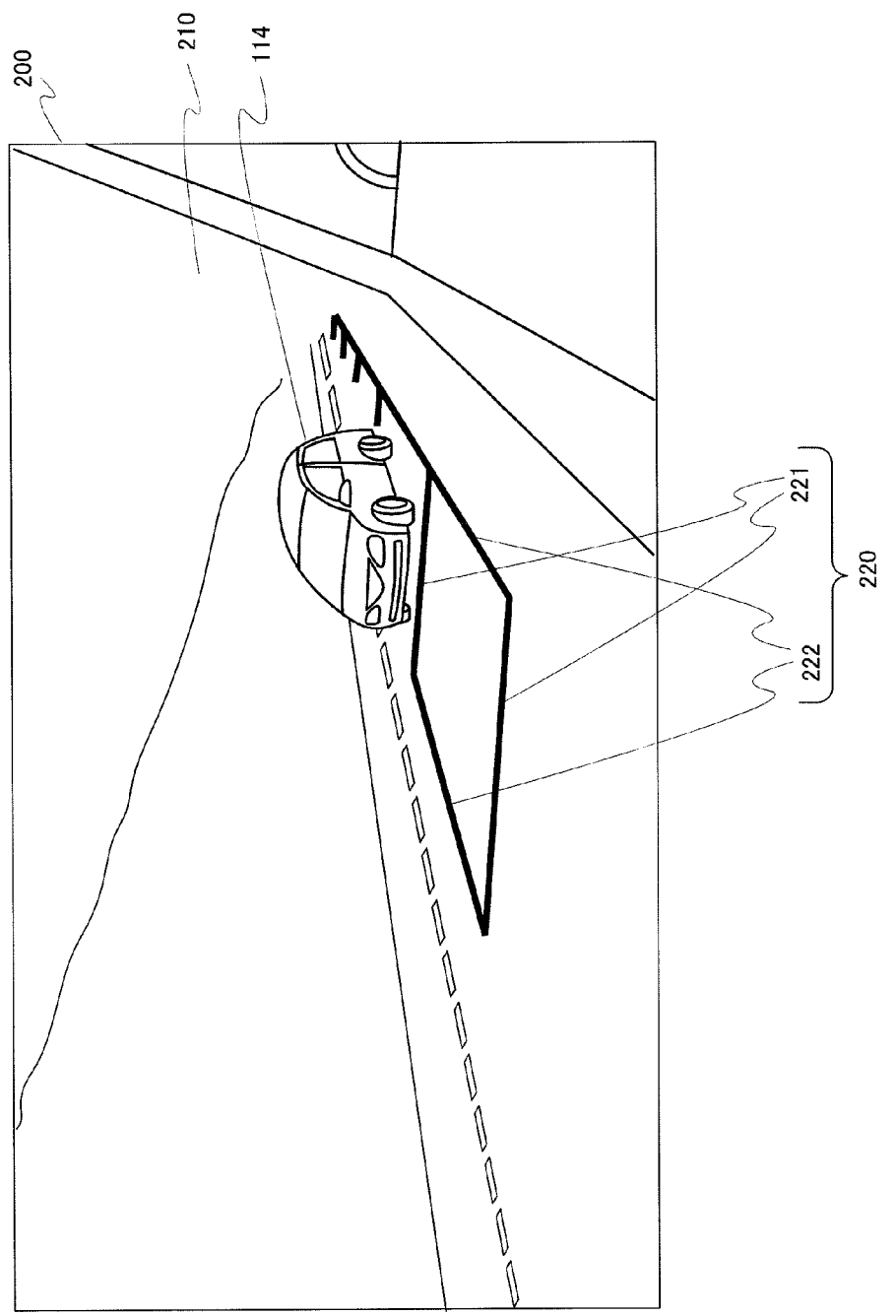
FIG. 4 shows an example of a display image synthesized by display image generating section of drive support apparatus according to Embodiment 1.

FIG. 4 shows an example of the display image synthesized by display image generating section 160.

As illustrated in FIG. 4, on display screen 200 of display section 170 (FIG. 1), side rear image 210 in which the right side rear is viewed from the subject vehicle, another vehicle 114 inside side rear image 210, and superimposed image 220 are synthesized and displayed.

Superimposed image 220 is displayed by a concatenation of frames in which the subject vehicle length is used as a reference unit of the distance. In further detail, superimposed image 220 is a concatenation of one or more frames including line segments 221 parallel to a width direction of a road and line segments 222 parallel to a road direction. Superimposed image 220 is displayed on the road surface of a lane adjacent to the present lane on side rear image 210 from the driver's point of view when it is displayed by a concatenation of frames. Further, a predetermined number (5 in FIG. 4) of superimposed images 220 are lined rearward from the driver's point of view, starting from the position of the subject vehicle's rear end inside side rear image 210.

Here, as superimposed image 220, a concatenation of frames may be displayed only when the distance to other vehicles 114 is included within the distance represented by a concatenation of frames, or only a frame present ahead of the distance to other vehicles from the driver's point of view may be displayed.

Further, as illustrated in FIG. 4, a frame present ahead of the distance to other vehicles from the driver's point of view is displayed, and as for more distant frames, a portion around a connection section between a line segment that is parallel to the width direction of the road and at the side close to the present lane and a line segment that is connected to and perpendicular to the line segments is displayed as the superimposed image. Through superimposed image 220, the distance to other vehicles can be intuitively learned, and since sections farther than another vehicle 114 are simplified while displaying the subject vehicle length line segment thereof, visibility can be improved.

Next, a specific method of generating and displaying the superimposed image will be described.

Figure 5:
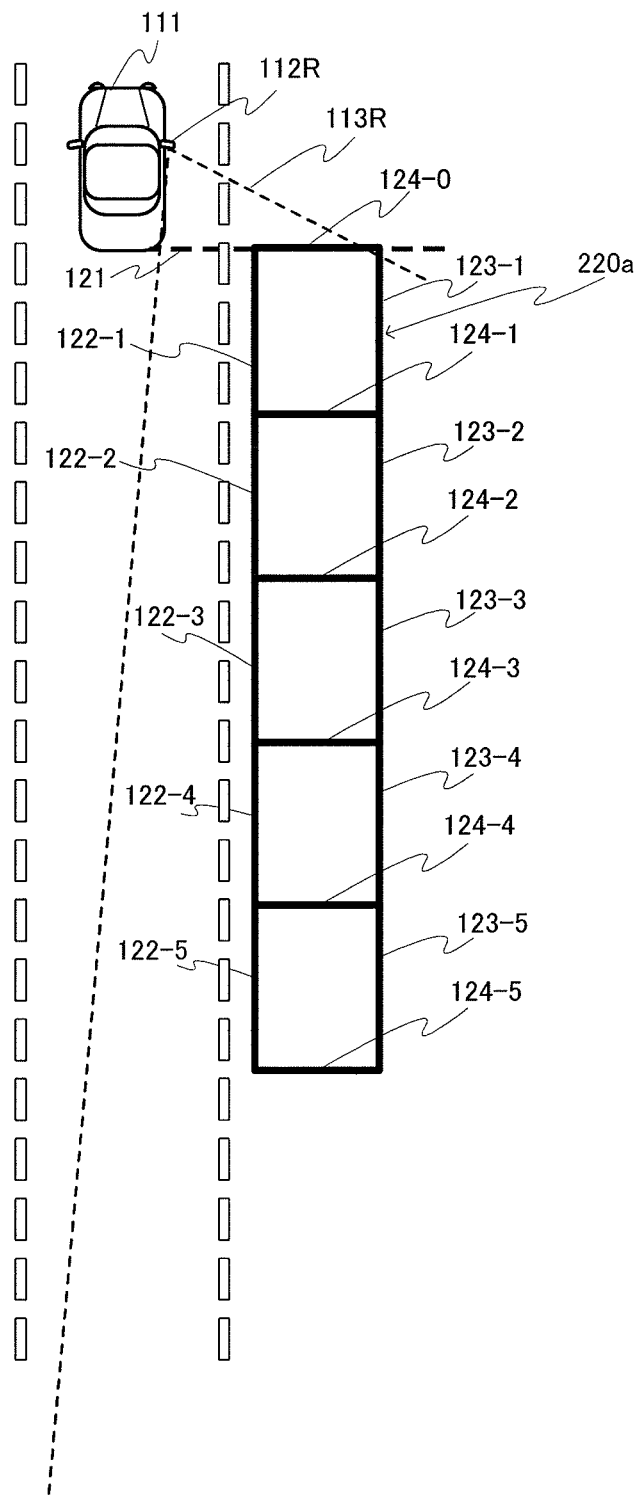
FIG. 5 shows a creating process of a superimposed image of drive support apparatus according to Embodiment 1.
Figure 6:
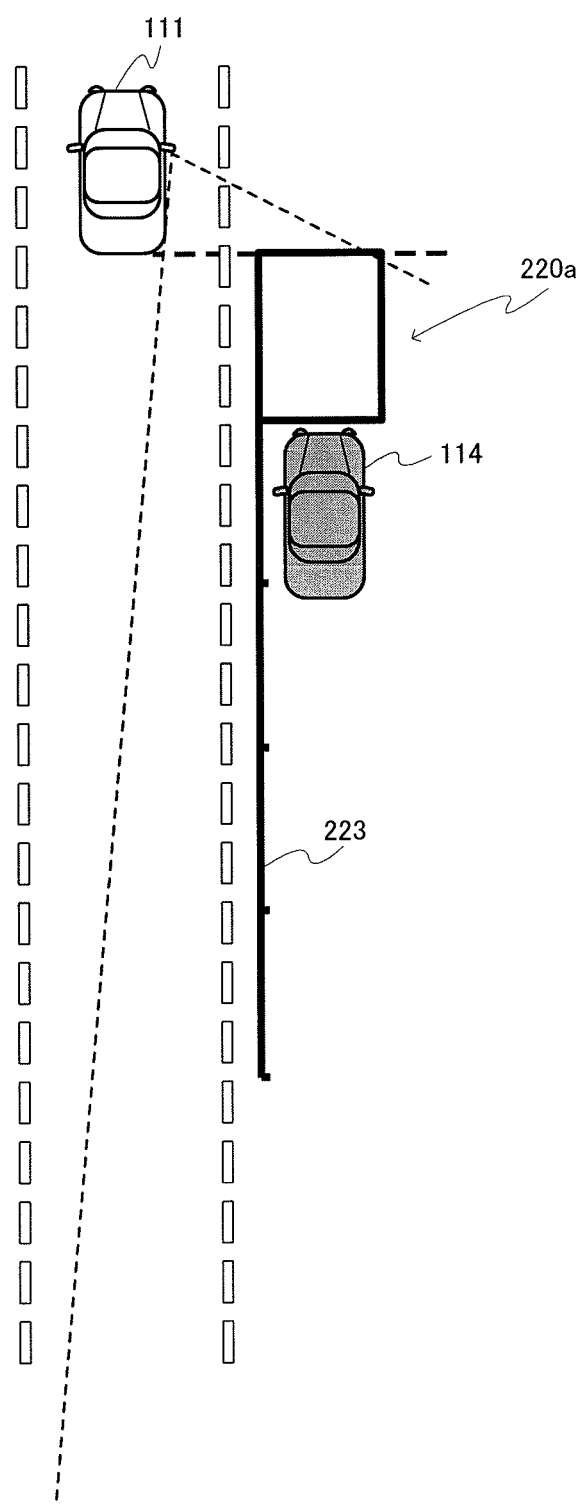
FIG. 6 shows a creating process of a superimposed image of drive support apparatus according to Embodiment 1.

FIGS. 5 and 6 are views illustrating a process of creating the superimposed image.

It is assumed that frames 220a concatenated rearward starting from line 121 of the subject vehicle's rear end are present, in field of view 113R of camera 112R that captures the right side rear, on a lane adjacent to the right of the present lane on which subject vehicle 111 is running as illustrated in FIG. 5.

In this case, frames 220*a* are superimposed image 220 (see FIG. 4). Here, a concatenation of frames 220*a* has the length of up to five subject vehicles, and frames 220*a* includes inside line segments 122-1 to 122-5, outside line segments 123-1 to 123-5, and distance lines 124-0 to 124-5, which are lined at regular intervals in a subject vehicle length unit, with respect to the subject vehicle.

Let us assume that on the concatenation of frames 220*a* assumed as described above, another vehicle 114 has been detected at the distance of 1.1 times the subject vehicle length unit from the subject vehicle's rear end in a unit of the subject vehicle length at a certain point in time as illustrated in FIG. 6. In this case, outside line segments behind another vehicle 114, that is, 123-2, 123-3, 123-4, and 123-5 of FIG. 5 are not used for the superimposed image. Further, distance lines behind another vehicle 114, that is, line segments 124-2, 123-3, 123-4, and 124-5 in FIG. 5 are not used except parts that are connected to inside line segments. If it is specifically represented on a plane surface, it becomes support information 223 of superimposed image 220.

Support information 223 is converted to an image of a point of view from camera 112R, so that superimposed image 220 superimposed on side rear image 210 (see FIG. 4) is formed. Distance measuring section 120 calculates the distance corresponding to each pixel on an image. Superimposed image generating section 140 generates an image corresponding to support information 223 on the road surface of an adjacent lane based on the measured distance. Accordingly, display image 220 illustrated in FIG. 4 is generated.

As described above in detail, drive support apparatus 100 of the present embodiment includes imaging section 110 that captures the side rear image of the subject vehicle, distance measuring section 120 that measures the distance between the subject vehicle and other vehicles, and vehicle detecting section 130 that detects other vehicles inside the captured image. Superimposed image generating section 140 calculates the distance of the subject vehicle length unit based on the subject vehicle length information stored in subject vehicle length information storage section 150 and the distance to other vehicles detected by distance measuring section 120 and generates the supper imposed image based on the calculated distance. Display image generating section 160 synthesizes the superimposed image generated by superimposed image generating section 140 on the peripheral image including the side rear image captured by imaging section 110 and displays the synthesized image on display section 170 installed at the position where the driver's filed of front vision is not obstructed.

Through this configuration, the driver can view the side rear image in which the superimposed image having the subject vehicle length as the reference unit of the distance is synthesized and more intuitively learn the distance from other vehicles. That is, the driver can intuitively recognize how far other vehicles are behind away from the subject vehicle and how fast other vehicles are approaching in a subject vehicle length unit. For example, the driver can intuitively recognize that another vehicle is 2.5 times the subject vehicle length far from the subject vehicle. Particularly, when applied to the electronic mirror system, it is possible to solve the problem in that it is difficult to get a feeling of distance while taking advantage of the electronic mirror system (advantage of removing the dead angle by the wide-angle video). Since the distance between the subject vehicle length and another vehicle can be instantly recognized, misunderstanding of the distance is prevented, for example, at the time of high speed traveling, and thus a possibility of an accident can be prevented.

Further, it is possible to intuitively learn the distance to other vehicles while checking a status of the side rear, and thus a lane change operation can be more accurately performed.

Further, in the present embodiment, superimposed image generating section 140 generates a concatenation of one or more frames including a line segment parallel to the width direction of the road and a line segment parallel to the road direction as the superimposed image. The concatenation of frames can be recognized as if it is drawn on the road surface of the lane adjacent to the present lane on the side rear image. Through this configuration, the superimposed image can be recognized with the same sense of perspective as the side rear image, and thus the distance from other vehicles can be learned more intuitively.

Further, a predetermined number of concatenations of frames are lined rearward in the side rear image, starting from the position of the subject vehicle's rear end in the side rear image. Thus, since the distance from the subject vehicle's rear end is recognized, it is possible to more reliably learn the distance from other vehicles at the time of lane change.

Further, as illustrated in FIG. 4, the concatenation of frames is displayed only when the distance to other vehicles is included within the distance represented by the concatenation of frames. Thus, since the concatenation of frames is not displayed when other vehicles do not approach up to a predetermined distance, there is an effect capable of easily recognizing the presence and absence of approaching vehicles to look out.

Further, as illustrated in FIG. 4, only a frame present, on the side rear image, ahead of the distance to other vehicles is generated as the superimposed image. Thus, since a line does not extend onto the approaching vehicle inside the side rear image, when the approaching vehicle is present, the presence of the approaching vehicle can be easily discriminated.

Further, as illustrated in FIG. 4, a frame present, on the side rear image, ahead of the distance of another vehicle is displayed, and as for a frame behind another vehicle, only a portion around a connection section between a line segment that is parallel to the width direction of the road and at the side close to the present lane and a line segment that is connected to and perpendicular to the line segment is displayed as the superimposed image. Thus, when a plurality of vehicles are lined, the approximate distance to a vehicle other than the closest vehicle can be measured.

In the present embodiment, the display position of the image may be controlled by detecting up-and-down movement of the vehicle with respect to the road surface so that the position of the superimposed image on the side rear image does not vibrate.

Further, relative speed calculating section that calculates a speed of other vehicles relative to the subject vehicle may be further installed, and superimposed image generating section 140 may generate the superimposed image representing the relative speed. For example, an image such as an arrow representing the magnitude of the relative speed may be additionally displayed according to the magnitude of the relative speed. According to this configuration, since the relative speed as well as the distance can be recognized, a judgment as to whether to perform an operation such as a lane change can be made in a shorter time.

In the present embodiment, the presence and absence of an adjacent lane may be detected by detecting a white line or the width of the road surface inside the image. In this case, detection of a vehicle may be performed only when the adjacent line is present.

Further, a display of a meter unit may be used together with the superimposed image generated by superimposed image generating section 140. In this case, the distance can be not only intuitively recognized but also accurately recognized in units of meters.

Embodiment 2

Figure 7:
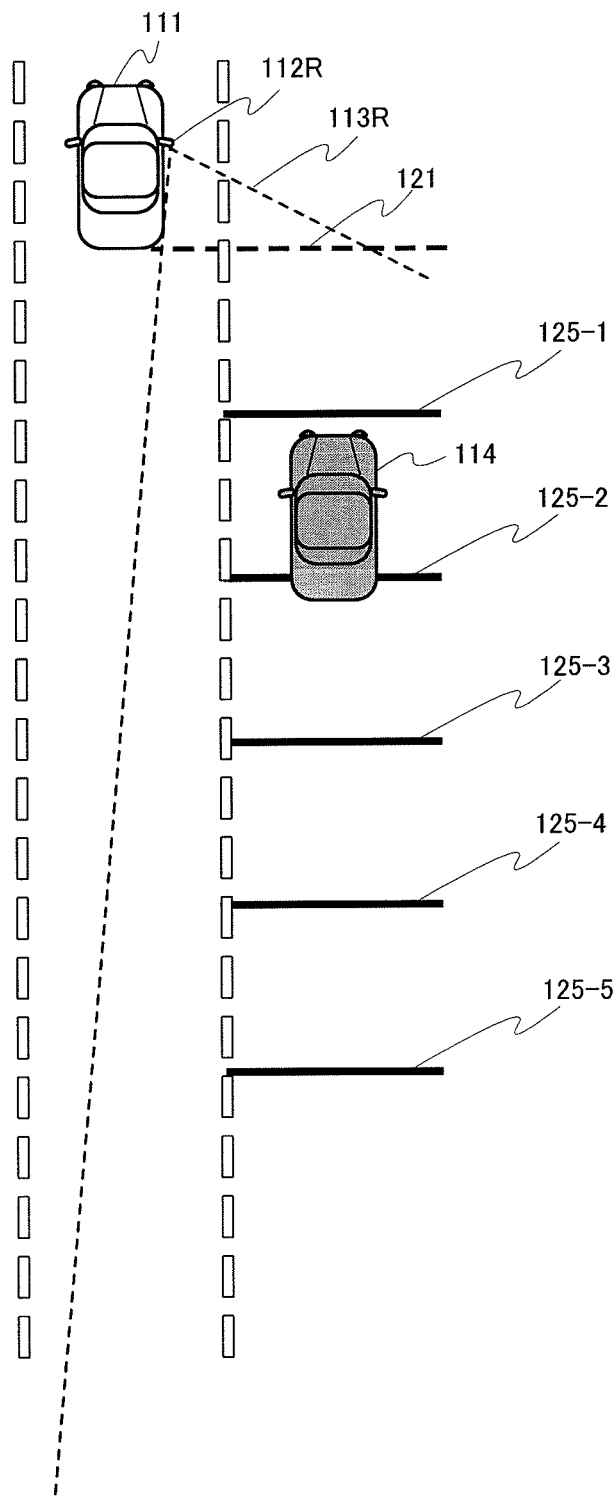
FIG. 7 shows a creating process of a superimposed image of drive support apparatus according to Embodiment 2 of the present invention.
Figure 8:
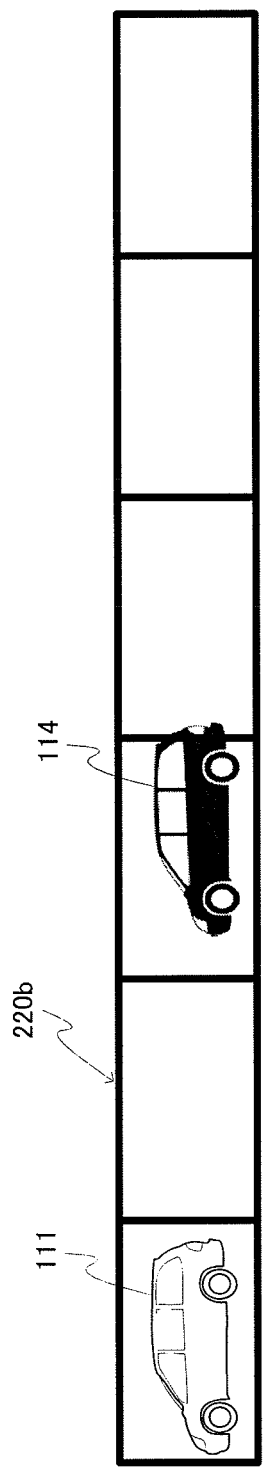
FIG. 8 shows an example of a superimposed image of drive support apparatus according to Embodiment 2.

FIG. 7 shows a creating process of a superimposed image of the drive support apparatus according to Embodiment 2. FIG. 8 shows an example of a superimposed image of drive support apparatus.

A hardware configuration is similar to that of drive support apparatus 100 of FIG. 1. In the present embodiment, superimposed image generation 140 is different in a superimposed image generating operation.

As illustrated in FIG. 7, distance lines 125-1 to 125-5 are assumed that are separated rearward at the same distance in a subject vehicle length unit behind line 121 of the subject vehicle's rear end, in field of view 113R of camera 112R that captures the right side rear, on a lane adjacent to the right of the present lane on which subject vehicle 111 is running. In this case, distance lines 125-1 to 125-5 are superimposed image.

It is assumed that in distance lines 125-1 to 125-5 assumed as described above, another vehicle 114 has been detected at the distance of 1.1 times the vehicle length from the subject vehicle's rear end in a subject vehicle length unit at a certain point in time. Superimposed image generating section 140 generates a simple image in which subject vehicle 111 is in the forefront, and subject vehicle 111 and another vehicle 114 which are running on the road surface are viewed from the side. FIG. 8 shows simple images of subject vehicle 111 and another vehicle 114 viewed from the side and a superimposed image represented by lattice 220b having intervals of a subject vehicle length.

As described above, the superimposed image is an image in which a symbol representing the subject vehicle is in the forefront, and other vehicles are displayed in rear position up to five subject vehicle length units. The symbol representing the subject vehicle is a symbol corresponding to the type of the subject vehicle (for example, a passenger car). Behind the subject vehicle symbol, the lattice 220b is displayed at intervals of the subject vehicle length, starting from the subject vehicle's rear end, and when the actual distance from other vehicles changes, other vehicles inside the superimposed image moves within lattice 220 in proportion to a change in distance. In the superimposed image, a direction of the subject vehicle is a right direction (a left direction in the case of a left camera image).

When another vehicle 114 gets closer to subject vehicle 111 and is closer than the subject vehicle's rear end, a form in which a symbol of another vehicle is superimposed on the subject vehicle's symbol is displayed. This case is a status in which another vehicle 114 is passing subject vehicle 111 ahead.

A display of FIG. 7 and a display of FIG. 8 are preferably displayed at the same time. The display of FIG. 7 and the display of FIG. 8 may be switched and displayed.

As described above, according to the present embodiment, superimposed image generating section 140 generates the superimposed image that has a compartment having the length of the subject vehicle unit and includes a line segment viewed in the transverse direction of the vehicle and the subject vehicle and other vehicles whose symbols are displayed on the line segment. That is, superimposed image generating section 140 positions the subject vehicle symbol in the front, delimits the rear space by the length of the subject vehicle, and generates symbols of other vehicles according to the distance to other vehicles in an adjacent lane. Through this configuration, since a positional relationship of a vehicle can be intuitively learned in the transverse direction with respect to the moving direction, the distance between vehicles can be more intuitively recognized.

Further, as illustrated in FIG. 7, superimposed image generating section 140 generates the superimposed image representing the distance to other vehicles in proportion to the length from the subject vehicle symbol rear end, starting from the position of the subject vehicle's rear end. Thus, since a real time change in a relative distance between the subject vehicle symbol and another vehicle's symbol can be intuitively recognized, a change in a positional relationship can be learned more intuitively.

Further, when the front end of another vehicle is ahead of the rear end of the subject vehicle, the symbol of the subject vehicle may be highlighted without displaying symbols of other vehicles.

In this case, since another vehicle's symbol is not displayed, compared to when the subject vehicle and other vehicles are displayed in the superimposed manner, it is possible to further draw the driver's attention and inform the driver of a danger.

Further, since the front direction is used as the same direction as a direction of imaging section that captures the side rear image and corresponding another vehicle moves in almost the same direction, the positional relationship between the subject vehicle and other vehicles can be learned more intuitively.

Further, by displaying the subject vehicle and other vehicles using symbols, the positional relationship between the subject vehicle and other vehicles can be learned more intuitively.

In the present embodiment, when another vehicle is closer than the subject vehicle's rear end, the image of another vehicle may be highlighted, for example, through flickering or coloring.

Further, in the present embodiment, when a plurality of other vehicles are detected at the same time, another vehicle's symbol may be displayed for the plurality of other vehicles. Further, the body color of another vehicle may be detected, and the body color of the corresponding another vehicle's symbol may be colored with the detected color.

Further, a superimposed image representing a positional relationship when the subject vehicle and other vehicles are viewed from the above may be displayed.

Furthermore, the superimposed image of the subject vehicle and other vehicles may be generated as an image in the vertical direction other than the transverse direction.

Embodiment 3

Figure 9:
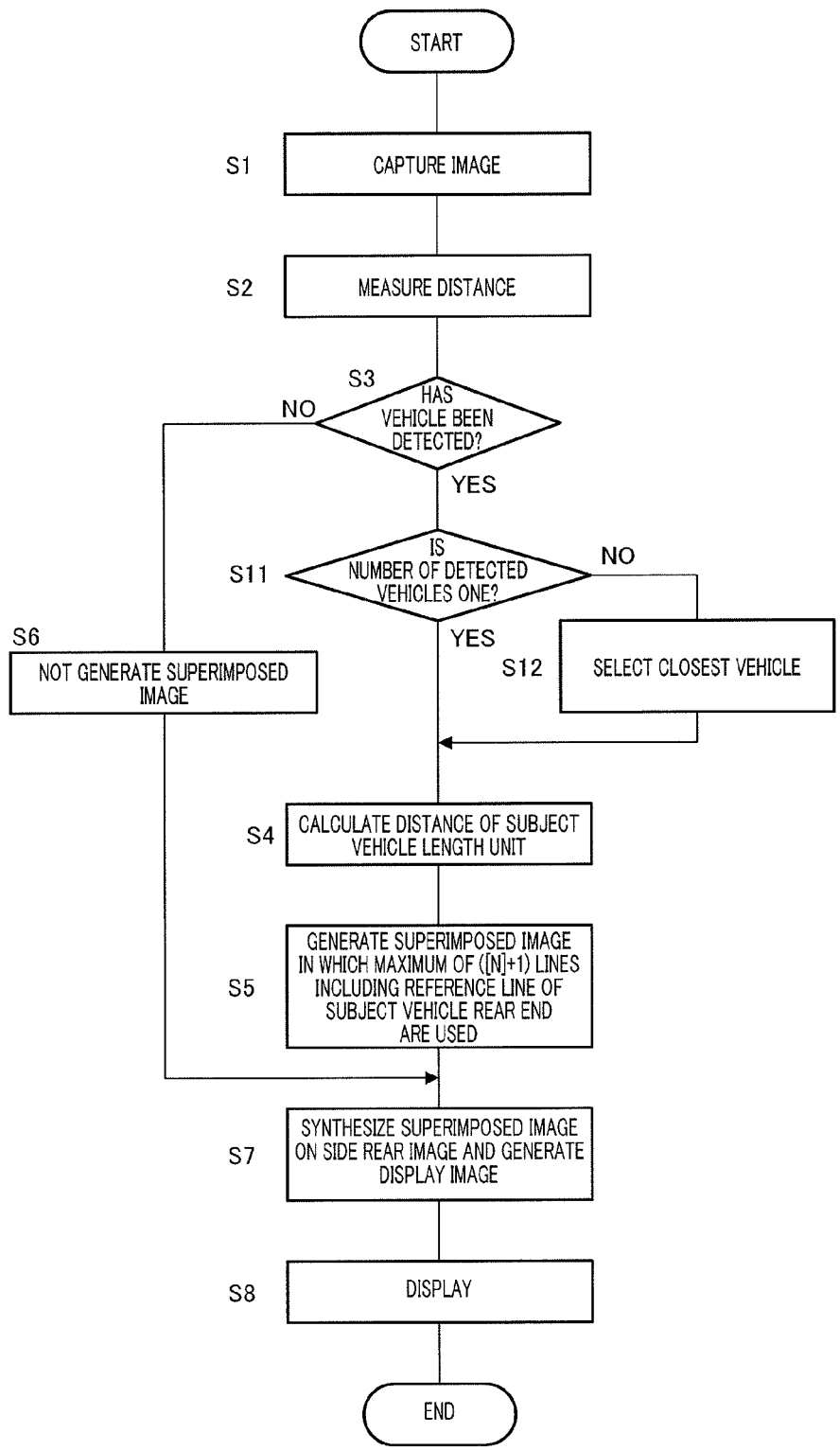
FIG. 9 is a flowchart showing an operation of drive support apparatus according to Embodiment 3 of the present invention.

FIG. 9 is a flowchart showing an operation of drive support apparatus according to Embodiment 3 of the present invention. FIG. 9 illustrates a processing flow in which detection of a plurality of vehicles is considered. The same steps as in FIG. 3 are denoted by the same reference numerals.

A hardware configuration is similar to that of drive support apparatus 100 of FIG. 1. In the present embodiment, vehicle detecting section 130 detects a plurality of other vehicles based on the distance measuring result. Superimposed image generating section 140 generates the superimposed image on the closest vehicle.

In step S1, cameras 112L and 112R, that is, imaging section 110 acquires the stereo image at set timing and transmits the stereo image to distance measuring section 120 and display image generating section 160. Since imaging section is the stereo camera, two images are captured by one imaging section, but any one of the two images may be transmitted to display image generating section.

In step S2, distance measuring section 120 measures the distance by generating the distance image based on the stereo image.

In step S3, vehicle detecting section 130 detects a vehicle (that is, another vehicle) based on the distance measuring result and checks whether or not a vehicle has been detected.

When another vehicle is not detected in the image, in step S6, superimposed image generating section 140 does not generate any superimposed image, and the process proceeds to step S7.

In step S7, display image generating section 160 synthesizes the superimposed image with the side rear image and generates the display image. Here, superimposed image generating section 140 does not generate any superimposed image. Display image generating section 160 synthesizes an output of superimposed image generating section 140 that has not generated anything with the side rear image. The result is the side rear image as it is.

In step S8, display section 170 displays the side rear image "as it is", and then the present flow is finished.

Meanwhile, when vehicle detecting section 130 has detected a vehicle (that is, another vehicle) in step S3, the process proceeds to step S11.

In step S11, superimposed image generating section 140 judges whether or not the number of detected vehicles is one (the number of detected vehicles=1).

Figure 10:
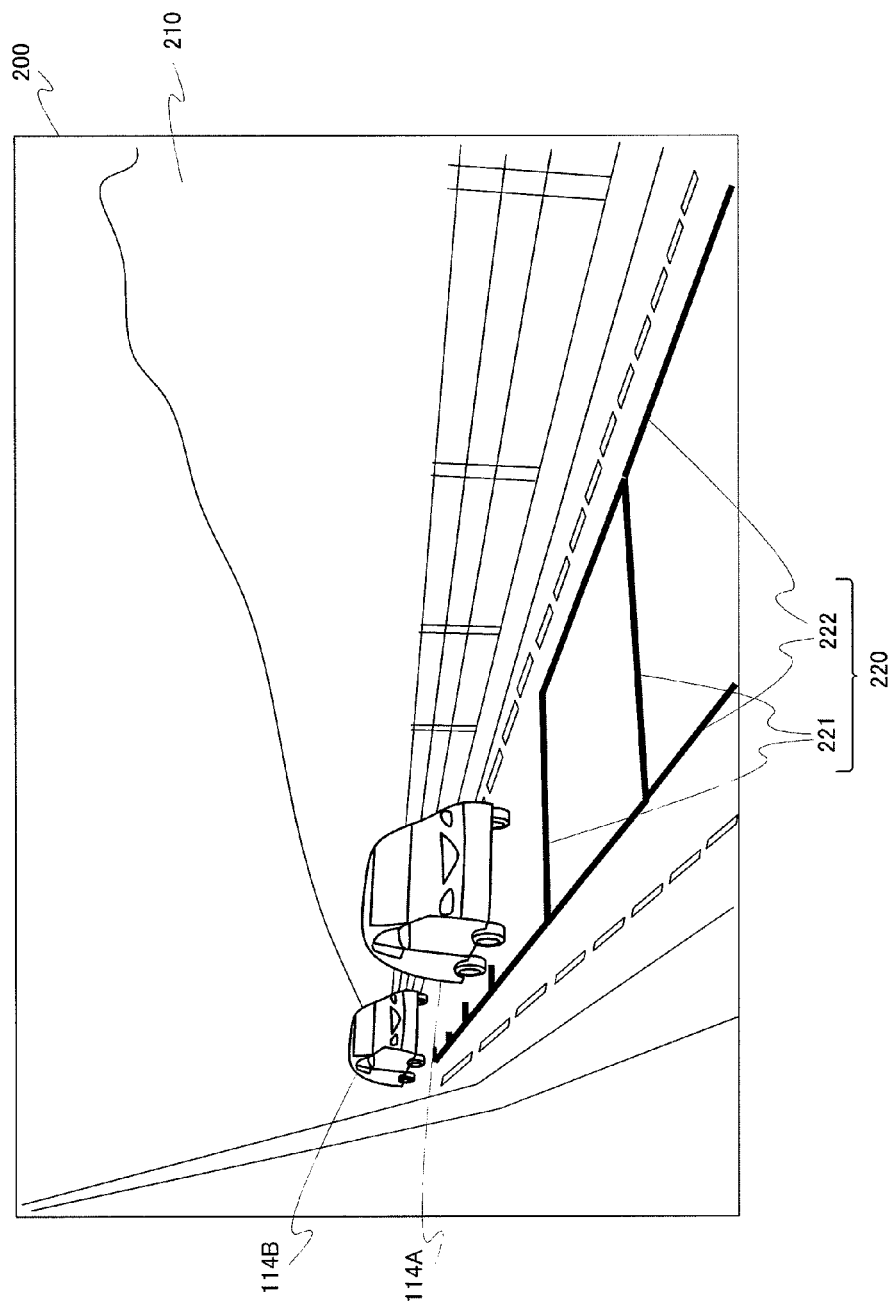
FIG. 10 shows an example of a case where a plurality of vehicles are detected by vehicle detecting section of drive support apparatus according to Embodiment 2.

When the number of detected vehicles is two or more, in step S12, superimposed image generating section 140 selects a vehicle closest to the subject vehicle based on the distance measuring result among the detected vehicles, and then the process proceeds to step S4. For example, as illustrated in FIG. 10 which will be described later, of detected vehicles 114A and 114B, another vehicle 114A closest to the subject vehicle is selected. When the number of detected vehicles is one, the process simply proceeds to step S4.

In step S4, superimposed image generating section 140 calculates the distance of the subject vehicle length unit based on the subject vehicle length information stored in subject vehicle length information storage section 150 and the distance to other vehicles. For example, if d1 [m] is defined as the distance from camera 112R to the vehicle's rear end, d2 [m] as the distance to other vehicles, and L [m] as the subject vehicle length, the approximate distance D of the subject vehicle length unit from the subject vehicle's rear end to another vehicle is represented by equation 1.

In step S5, superimposed image generating section 140 generates the superimposed image using the distance D. Specifically, the superimposed image in which a maximum of ([N]+1) lines including a reference line of the subject vehicle's rear end are used is generated.

In step S7, display image generating section 160 synthesizes the superimposed image generated by superimposed image generating section 140 on the side rear image transmitted from imaging section 110 and generates the display image.

In step S8, display section 170 displays the display image in which the superimposed image is synthesized on the side rear image, and then the present flow is finished.

FIG. 10 shows an example of a case where vehicle detecting section 130 has detected a plurality of vehicles. FIG. 10 is a diagram corresponding to FIG. 4.

As illustrated in FIG. 10, on a display screen of display section 170 (FIG. 1), side rear image 210 obtained when a left side rear is viewed from the subject vehicle, other vehicles 114A and 114B inside side rear image 210, and superimposed image 220 are synthesized and displayed.

Superimposed image 220 is displayed by a concatenation of frames having the subject vehicle length as a reference unit of the distance. In further detail, superimposed image 220 is a concatenation of one or more frames including line segments 221 parallel to a width direction of a road and line segments 222 parallel to a road direction. Superimposed image 220 is displayed on the road surface of a lane adjacent to the present lane on side rear image 210 from the driver's point of view when it is displayed by a concatenation of frames. Further, a predetermined number (5 in FIG. 4) of superimposed images 220 are lined rearward from the driver's point of view, starting from the position of the subject vehicle's rear end inside side rear image 210.

Here, as superimposed image 220, a concatenation of frames may be displayed only when the distance to other vehicles 114 closest to the subject vehicle is included within the distance represented by a concatenation of frames, or only a frame present ahead of the distance to other vehicles from the driver's point of view may be displayed.

Further, as illustrated in FIG. 10, a frame present ahead of the distance to other vehicles from the driver's point of view is displayed, and as for more distant frames, only a portion around a connection section between a line segment that is parallel to the width direction of the road and at the side close to the present lane and a line segment that is connected to and perpendicular to the line segments is used as the superimposed image. Through superimposed image 220, the distance to other vehicles closest to the subject vehicle can be intuitively learned, and since sections farther than another vehicle 114 are simplified while displaying the subject vehicle length line segment thereof, visibility can be improved.

As described above, according to the present embodiment, when a plurality of other vehicles are detected at the same time, the superimposed image is generated on the closest vehicle. Thus, it is possible to deal with, for example, a situation in which another vehicle cuts in front of a vehicle in an adjacent lane.

Embodiment 4

Figure 11:
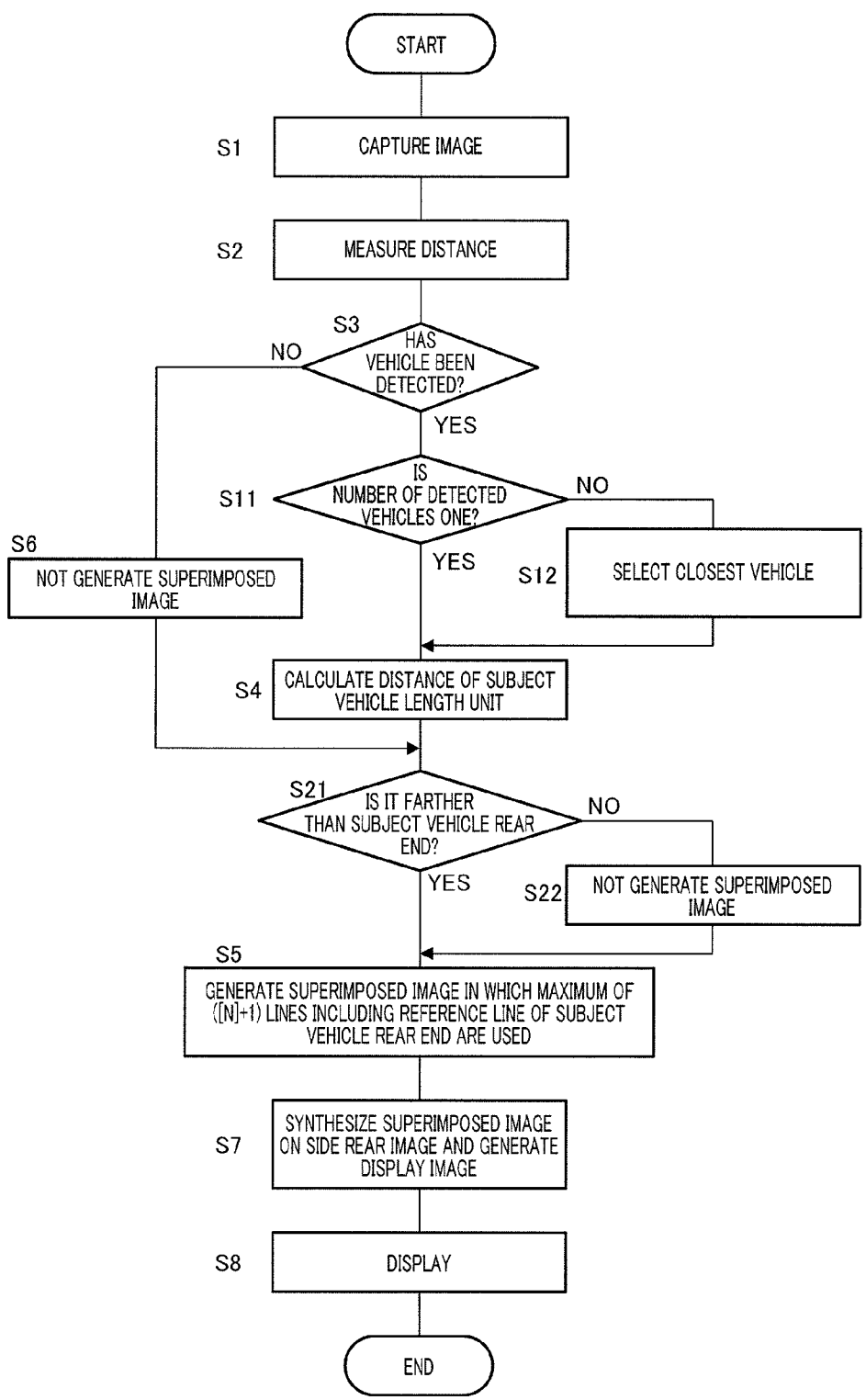
FIG. 11 is a flowchart showing an operation of drive support apparatus according to Embodiment 4 of the present invention.

FIG. 11 is a flowchart showing an operation of drive support apparatus according to Embodiment 4 of the present invention. FIG. 11 illustrates a processing flow in which detection of a plurality of vehicles and a vehicle closer than the subject vehicle's rear end are considered. The same steps as in FIG. 9 are denoted by the same reference numerals.

A hardware configuration is similar to that of drive support apparatus 100 of FIG. 1. In the present embodiment, vehicle detecting section 130 detects a plurality of other vehicles based on the distance measuring result. Superimposed image generating section 140 generates the superimposed image on a vehicle farther than the subject vehicle's rear end.

In step S1, cameras 112L and 112R, that is, imaging section 110 acquires the stereo image at set timing and transmits the stereo image to distance measuring section 120 and display image generating section 160. Since imaging section is the stereo camera, two images are captured by one imaging section, but any one of the two images may be transmitted to display image generating section.

In step S2, distance measuring section 120 measures the distance by generating the distance image based on the stereo image.

In step S3, vehicle detecting section 130 detects a vehicle (that is, another vehicle) based on the distance measuring result and checks whether or not a vehicle has been detected.

When another vehicle is not detected in the image, in step S6, superimposed image generating section 140 does not generate any superimposed image, and then the process proceeds to step S21.

In step S3, when vehicle detecting section 130 has detected a vehicle (that is, another vehicle), the process proceeds to step S11.

In step S11, superimposed image generating section 140 judges whether or not the number of detected vehicles is one (the number of detected vehicles=1).

When the number of detected vehicles is two or more, in step S12, superimposed image generating section 140 selects a vehicle closest to the subject vehicle based on the distance measuring result among the detected vehicles, and then the process proceeds to step S4. For example, as illustrated in FIG. 10, of detected vehicles 114A and 114B, another vehicle 114A closest to the subject vehicle is selected. When the number of detected vehicles is one, the process simply proceeds to step S4.

In step S4, superimposed image generating section 140 calculates the distance of the subject vehicle length unit based on the subject vehicle length information stored in subject vehicle length information storage section 150 and the distance to other vehicles. For example, if d1 [m] is defined as the distance from camera 112R to the vehicle's rear end, d2 [m] as the distance to other vehicles, and L [m] as the subject vehicle length, the approximate distance D of the subject vehicle length unit from the subject vehicle's rear end to another vehicle is represented by equation 1.

When the superimposed image is not generated in step S6 or when the distance of the subject vehicle length unit is calculated in step S4, the process proceeds to step S21.

In step S21, superimposed image generating section 140 judges whether or not another vehicle that is approaching the subject vehicle is farther than the subject vehicle's rear end.

When another vehicle that is approaching the subject vehicle is closer than the subject vehicle's rear end, that is, when another vehicle has passed the subject vehicle ahead, in step S22, superimposed image generating section 140 does not generate the superimposed image, and the process proceeds to step S5. When it is judged in step S21 that another vehicle that is approaching the subject vehicle is farther than the subject vehicle's rear end, the process simply proceeds to step S5.

In step S5, superimposed image generating section 140 generates the superimposed image using the distance D. Specifically, the superimposed image in which a maximum of ([N]+1) lines including a reference line of the subject vehicle's rear end are used is generated.

In step S7, display image generating section 160 synthesizes the superimposed image generated by superimposed image generating section 140 with the side rear image transmitted from imaging section 110 and generates the display image.

In step S8, display section 170 displays the display image in which the superimposed image is synthesized with the side rear image and finishes the present flow.

As described above, according to the present embodiment, when another vehicle is closer than the subject vehicle's rear end, the superimposed image is not generated. Thus, it is possible to deal with, for example, a situation in which another vehicle has passed the subject vehicle ahead.

Embodiment 5

In Embodiments 1 to 4, the side rear image has been used as an example of the peripheral image of the subject vehicle.

The peripheral image of the subject vehicle is desirable, and a side front image may be also implemented by a similar technique. Further, the side rear image may be combined with the side front image. A description will be made below in connection with Embodiment 5.

Figure 12:
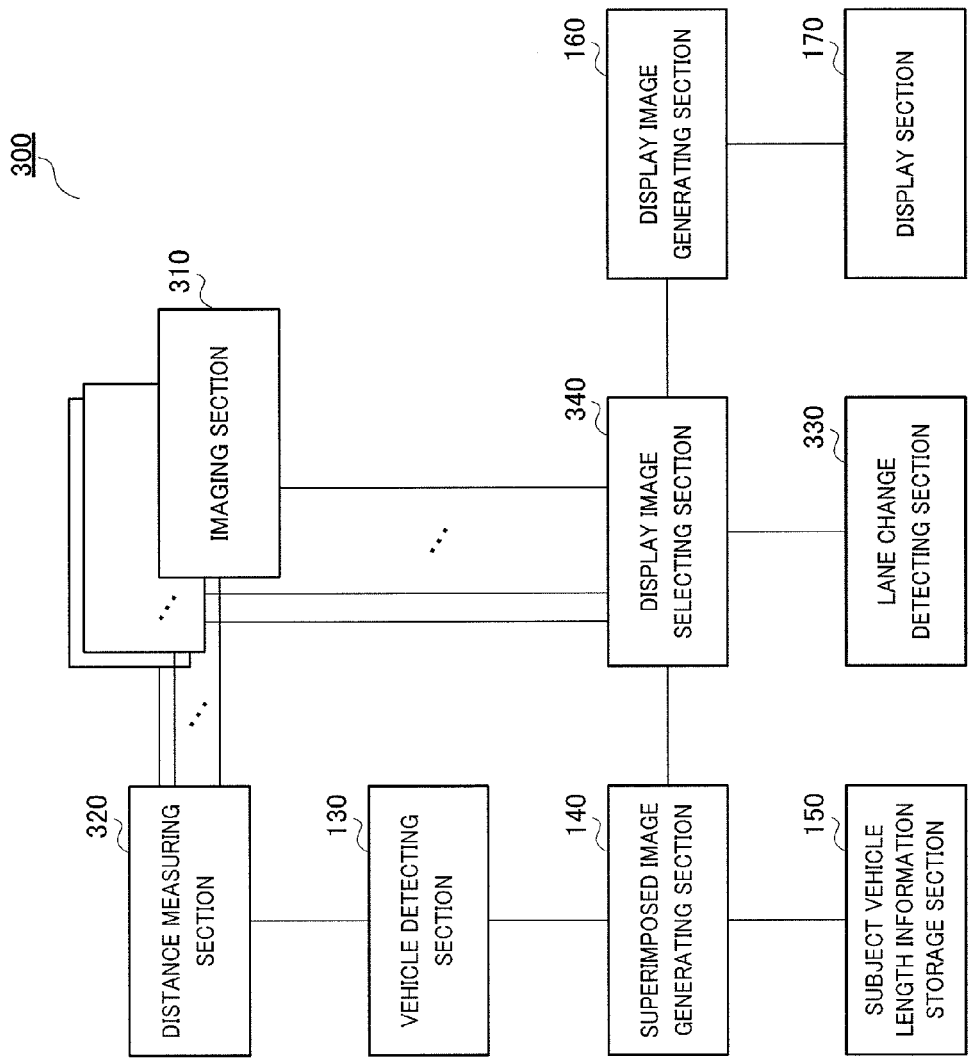
FIG. 12 is a block diagram showing a configuration of drive support apparatus according to Embodiment 5 of the present invention.

FIG. 12 is a block diagram showing a configuration of drive support apparatus according to Embodiment 5 of the present invention. The same components as in FIG. 1 are denoted by the same reference numerals, and thus a description thereof will not be repeated here.

As illustrated in FIG. 12, drive support apparatus 300 includes imaging section 310, distance measuring section 320, vehicle detecting section 130, superimposed image generating section 140, subject vehicle length information storage section 150, lane change detecting section 330, display image selecting section 340, display image generating section 160, and display section 170.

Imaging section 310 is a stereo camera for visible light or infrared light for acquiring an image around a vehicle. Imaging section 110 horizontally reverses a side rear image among a plurality of captured images without horizontally reversing the remaining images and then transfers the reversed side rear image to display image selecting section 340 and distance measuring section 320 to be used as a base image of the electronic mirror system. Since imaging section is the stereo camera, two images are captured by one imaging section, and any one of the two images may be transmitted to display selecting section. Further, imaging section 310 may have any configuration to the extent that it is configured to acquire a plurality of images around a vehicle. For example, imaging section 310 includes a plurality of cameras which are installed, for example, in the front, rear, left, and right of a vehicle and/or the back mirror as a first configuration. Imaging section 310 captures the neighborhood of the vehicle through one or more cameras in a wide range, clips predetermined areas of the side rear or the front of the vehicle from the image captured in the wide range, and acquires a plurality of images around the vehicle as a second configuration. The first configuration and the second configuration may be combined.

Distance measuring section 320 calculates of each of pixels inside a plurality of images based on the stereo image including the two images captured by imaging section 310. As a distance measuring algorithm using a stereo image, SAD, SSD, NCC, or the like is used.

Vehicle detecting section 130 detects other vehicles present inside a distance image generated by distance measuring section 320 using an object detecting algorithm. In the case of the stereo camera, since there are known algorithms such as a method using disparity or a plane projection stereo method, the known algorithms may be used.

Lane change detecting section 330 detects a lane change intention of the subject vehicle that tries to change a lane. Specifically, lane change detecting section 330 receives a winker signal of a direction indicator for passing ahead from a traveling control section (not shown) of the vehicle. Lane change detecting section 330 judges that there is an intention of changing a lane when the winker signal is received from the traveling control section (not shown) of the vehicle during traveling of the vehicle. As another method, lane change detecting section 330 judges whether or not there is a lane change intention by analyzing path guidance information based on path guidance of a navigation system (not shown) or by receiving a tag inside path guidance information that has been previously set and assuming that the vehicle will travel according to path guidance.

Display image selecting section 340 selects an image to display from a plurality of images captured by imaging section 310. A detailed description will be made later.

The functions of the above mentioned components are implemented by executing a control program through a microcomputer. That is, drive support apparatus 300 includes a CPU as a controller, a ROM storing a control program, a RAM for execution of a program, a camera as an imaging device, and a display section as a display/alarm device, and the controller controls operations of the components of drive support apparatus 300. The components of FIG. 12 are illustrated as blocks for performing a driving support process executed by the controller.

An operation of drive support apparatus 300 having the above described configuration will be described below.

Drive support apparatus 300 of the present embodiment has a feature in that a plurality of cameras included in imaging section 310 are installed, and lane change detecting section 330 and display image selecting section 340 are disposed.

Display image selecting section 340 selects an image to display from images acquired by a plurality of cameras included in imaging section 310.

An operation of display image selecting section 340 will be described.

In a system of the present embodiment, a display operation changes depending on the presence and absence of the lane change operation. Lane change detecting section 330 judges the presence and absence of the lane change operation based on the direction indicator or path guidance of the navigation system. When there is no lane change operation, drive support apparatus 300 displays all images of the vehicle that satisfy a caution judgment condition. The causation judgment condition is judged based on the distance from the subject vehicle, the approaching speed, time to collision (TTC), or a combination thereof. Further, only an image that needs the greatest caution may be selected and displayed.

Meanwhile, when there is a lane change operation, drive support apparatus 300 displays only an image of a vehicle that needs greater caution when a vehicle satisfying the caution judgment condition is detected on a lane change destination lane. Further, only an image that needs the greatest caution may be selected and displayed.

Figure 13:
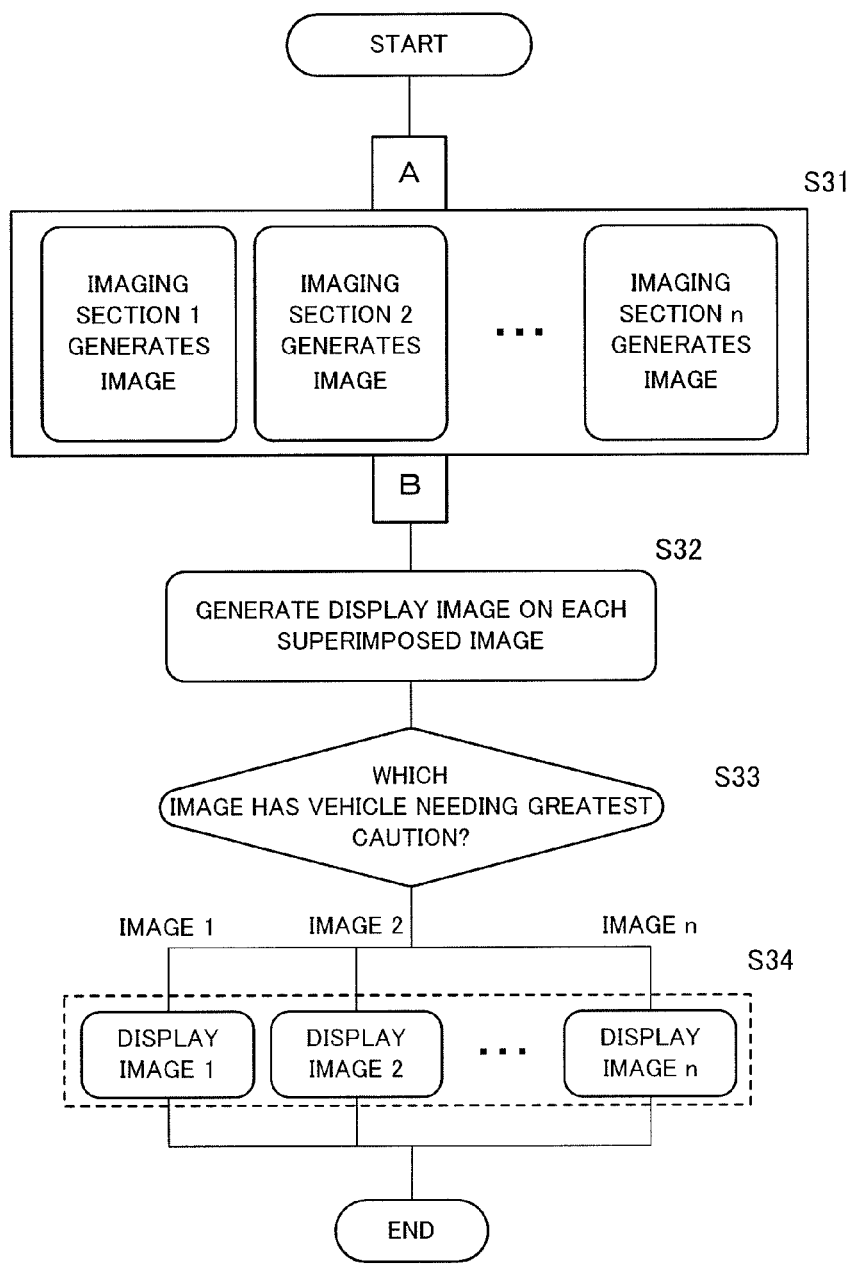
FIG. 13 is a flowchart showing an operation of drive support apparatus according to Embodiment 5 of the present invention.
Figure 14:
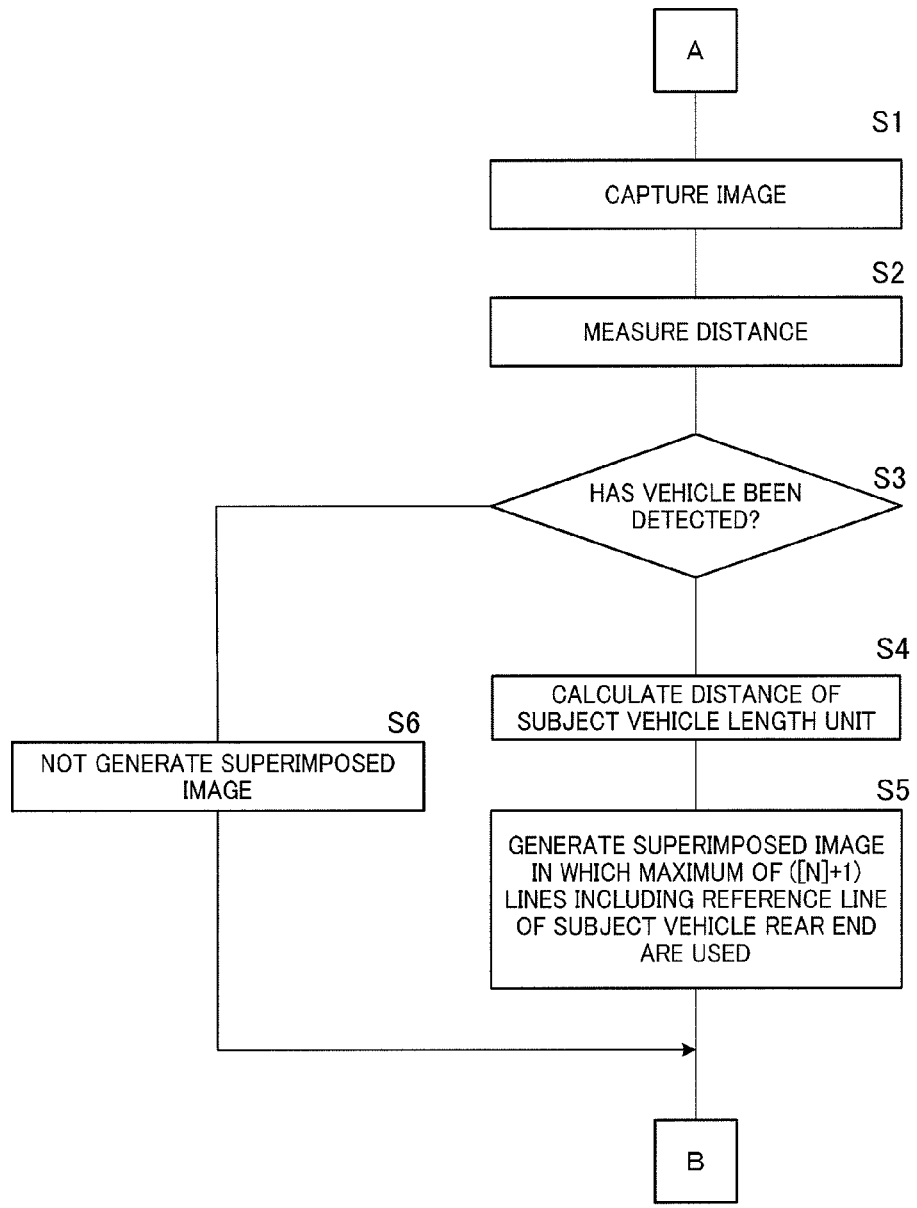
FIG. 14 is a flowchart showing an image generating process corresponding to an imaging section of drive support apparatus according to Embodiment 5.
Figure 15:
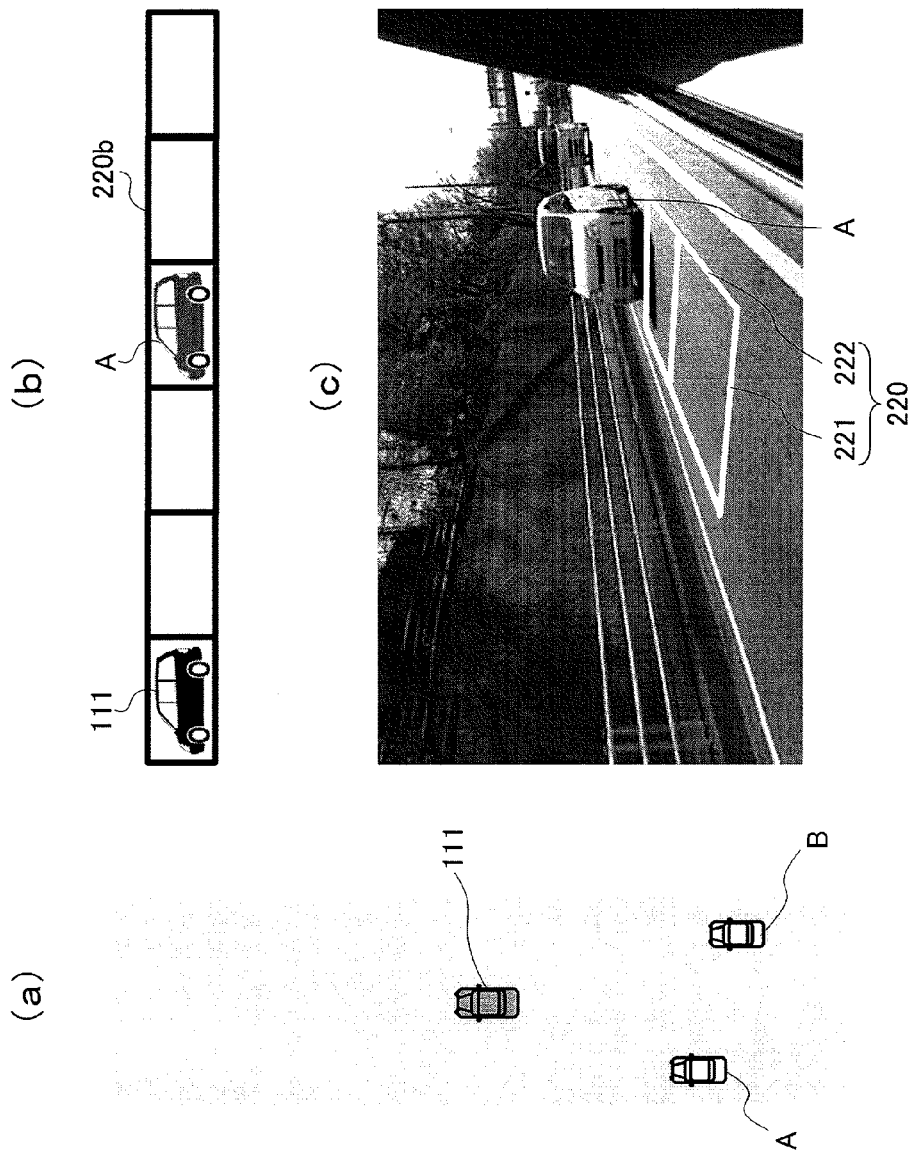
FIGS. 15A to 15C illustrate a creating process of a superimposed image of drive support apparatus according to Embodiment 5 and display examples of an image in which a superimposed image having a subject vehicle length as a reference unit of a distance has been synthesized.
Figure 16:
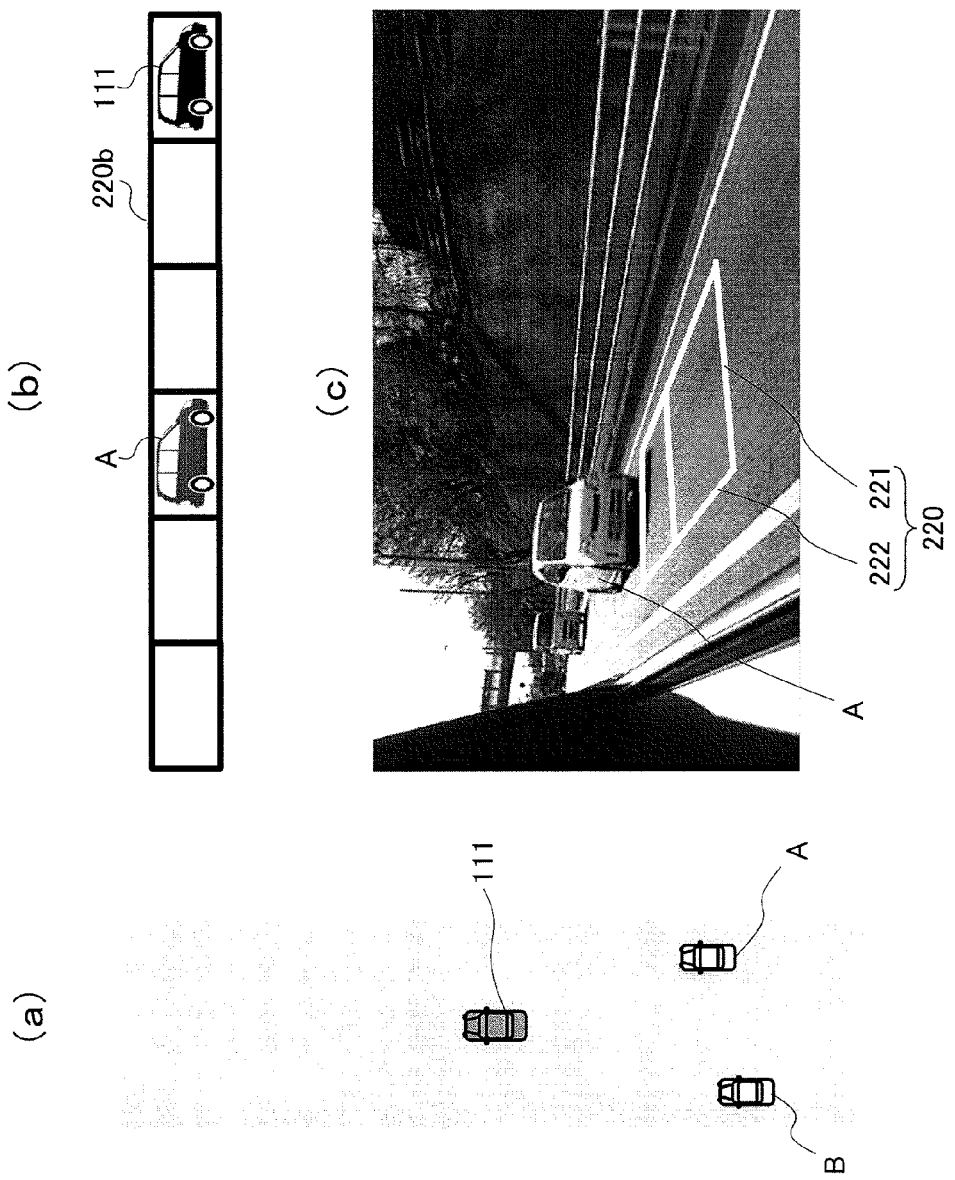
FIGS. 16A to 16C illustrate a creating process of a superimposed image of drive support apparatus according to Embodiment 5 and display examples of an image in which a superimposed image having a subject vehicle length as a reference unit of a distance has been synthesized.
Figure 17:
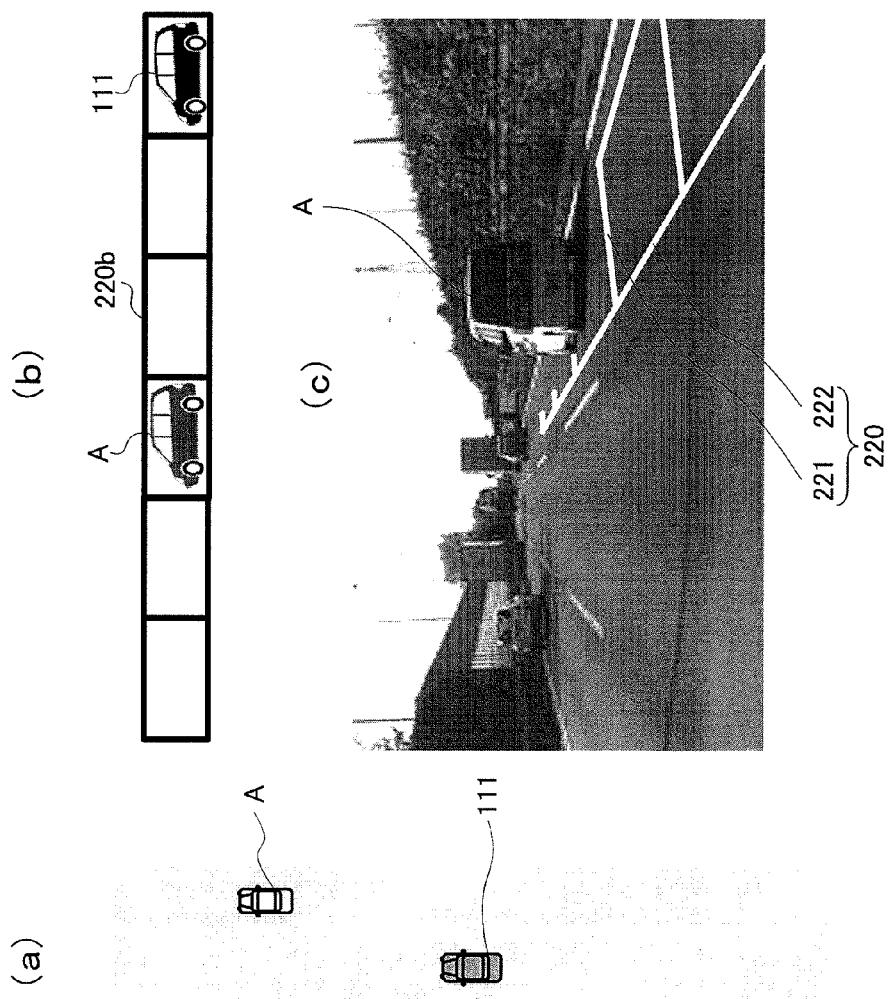
FIGS. 17A to 17C illustrate a creating process of a superimposed image of drive support apparatus according to Embodiment 5 and display examples of an image in which a superimposed image having a subject vehicle length as a reference unit of a distance has been synthesized.
Figure 18:
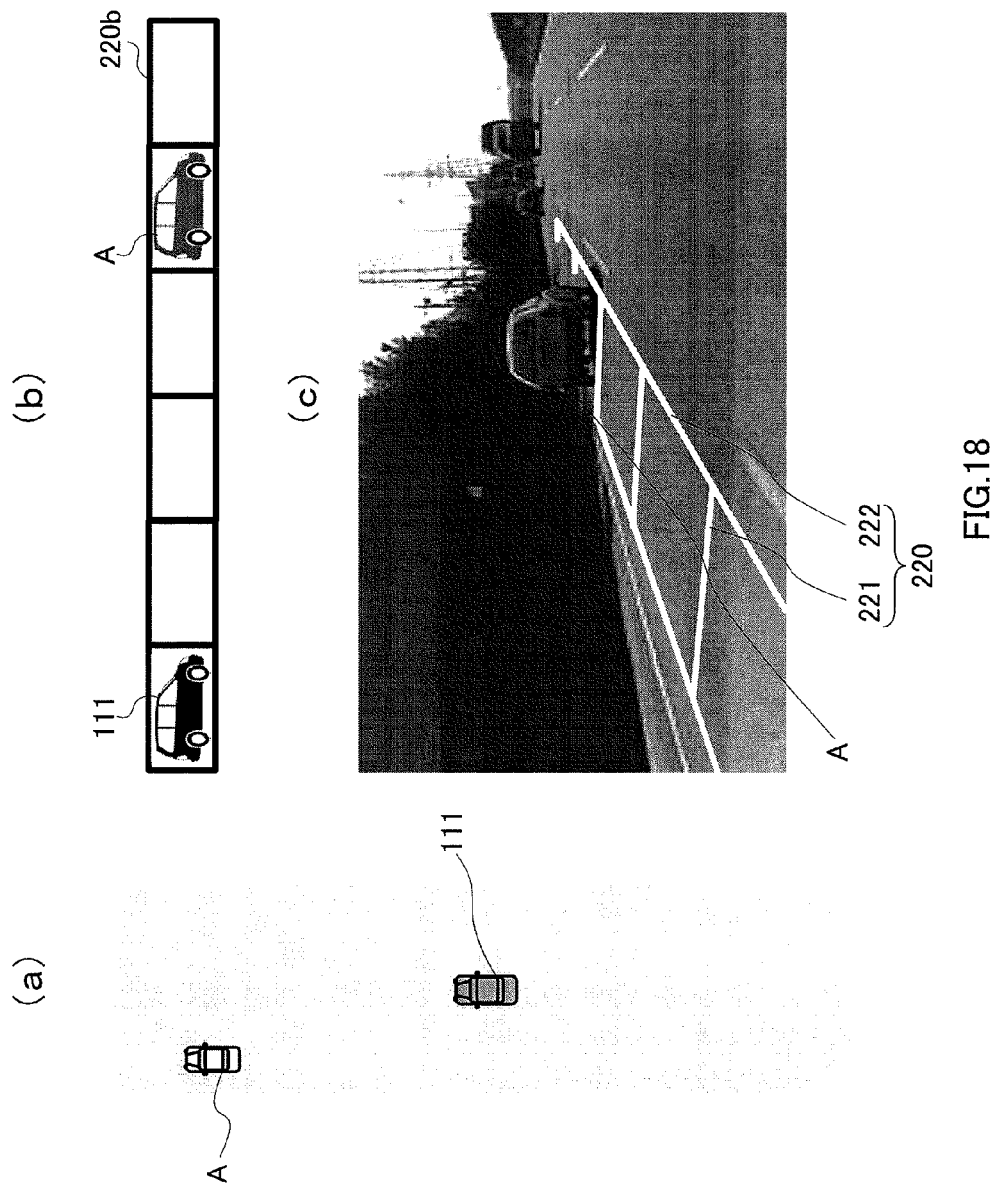
FIGS. 18A to 18C illustrate a creating process of a superimposed image of drive support apparatus according to Embodiment 5 and display examples of an image in which a superimposed image having a subject vehicle length as a reference unit of a distance has been synthesized.
Figure 19:
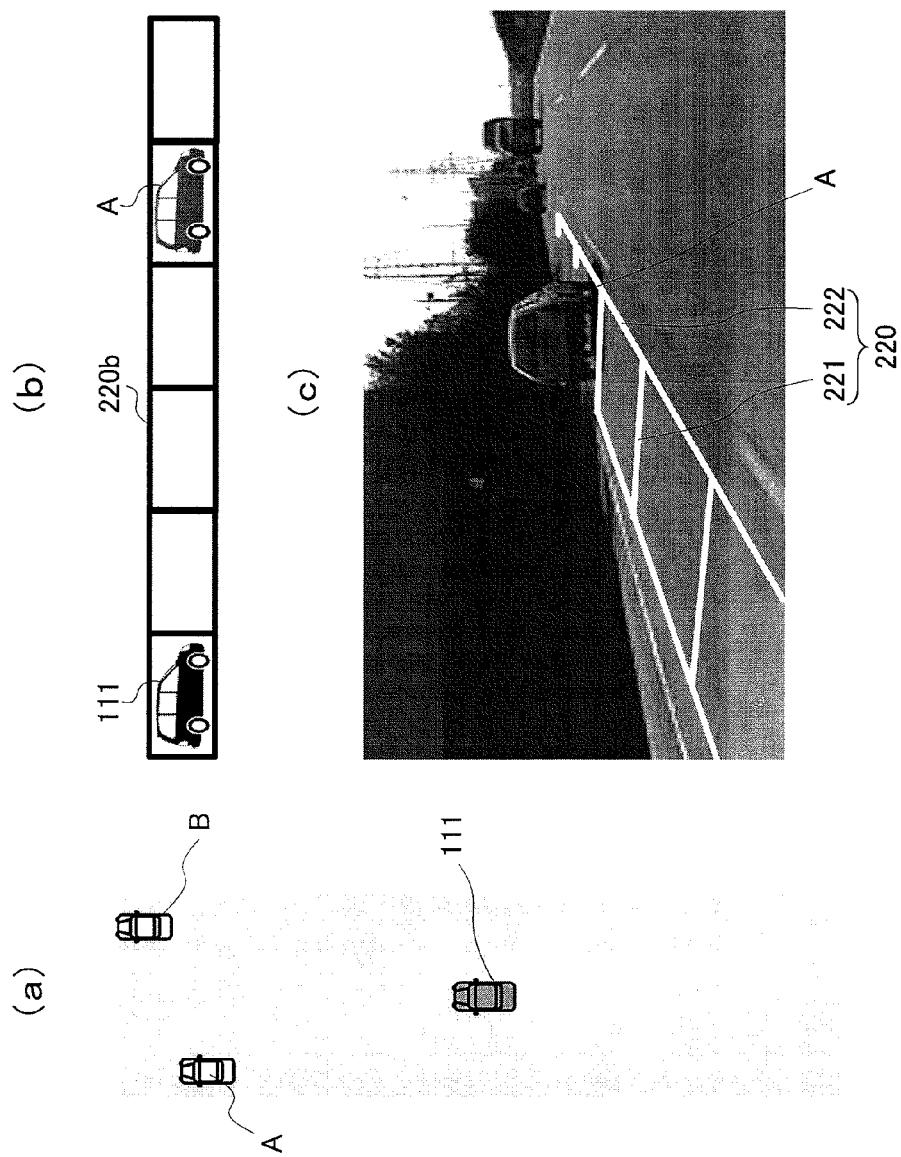
FIGS. 19A to 19C illustrate a creating process of a superimposed image of drive support apparatus according to Embodiment 5 and display examples of an image in which a superimposed image having a subject vehicle length as a reference unit of a distance has been synthesized.
Figure 20:
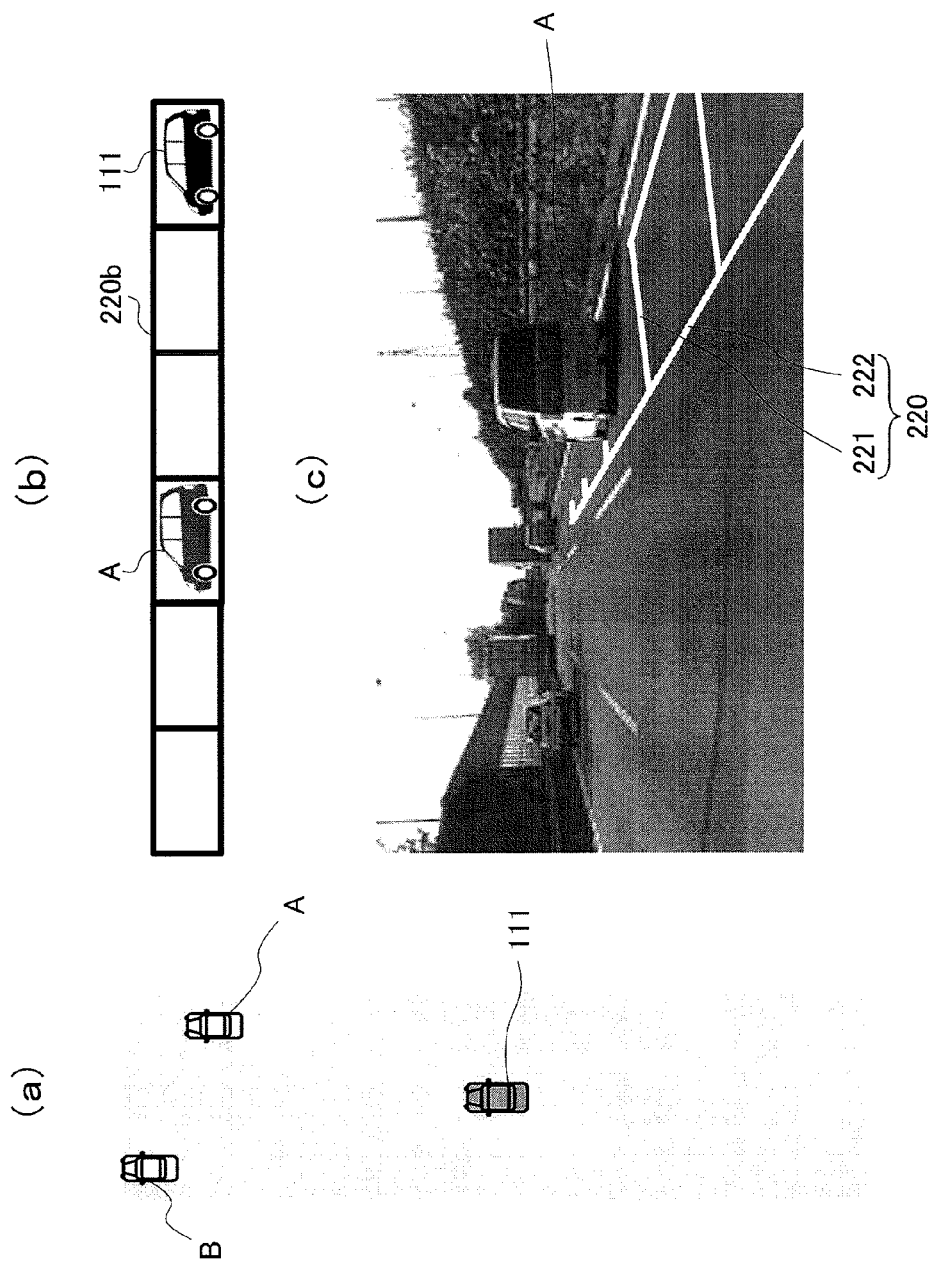
FIGS. 20A to 20C illustrate a creating process of a superimposed image of drive support apparatus according to Embodiment 5 and display examples of an image in which a superimposed image having a subject vehicle length as a reference unit of a distance has been synthesized.
Figure 21:
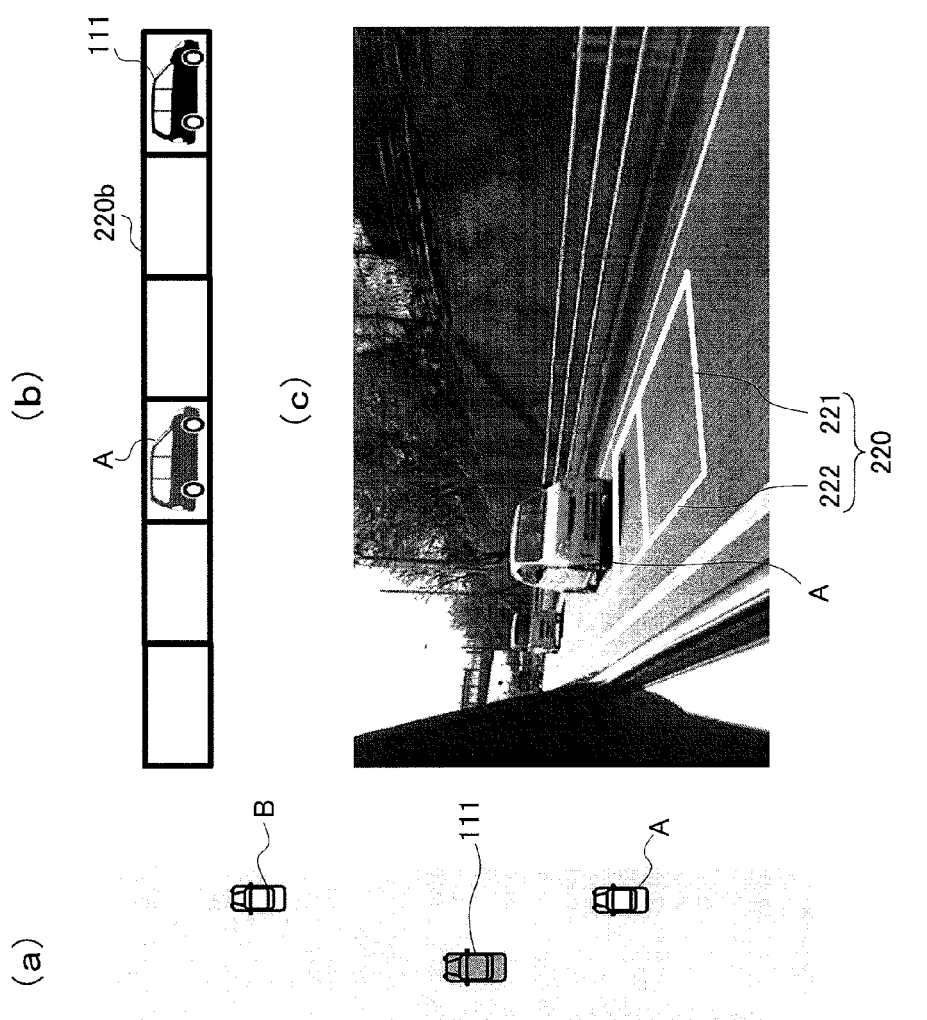
FIGS. 21A to 21C illustrate a creating process of a superimposed image of drive support apparatus according to Embodiment 5 and display examples of an image in which a superimposed image having a subject vehicle length as a reference unit of a distance has been synthesized.
Figure 22:
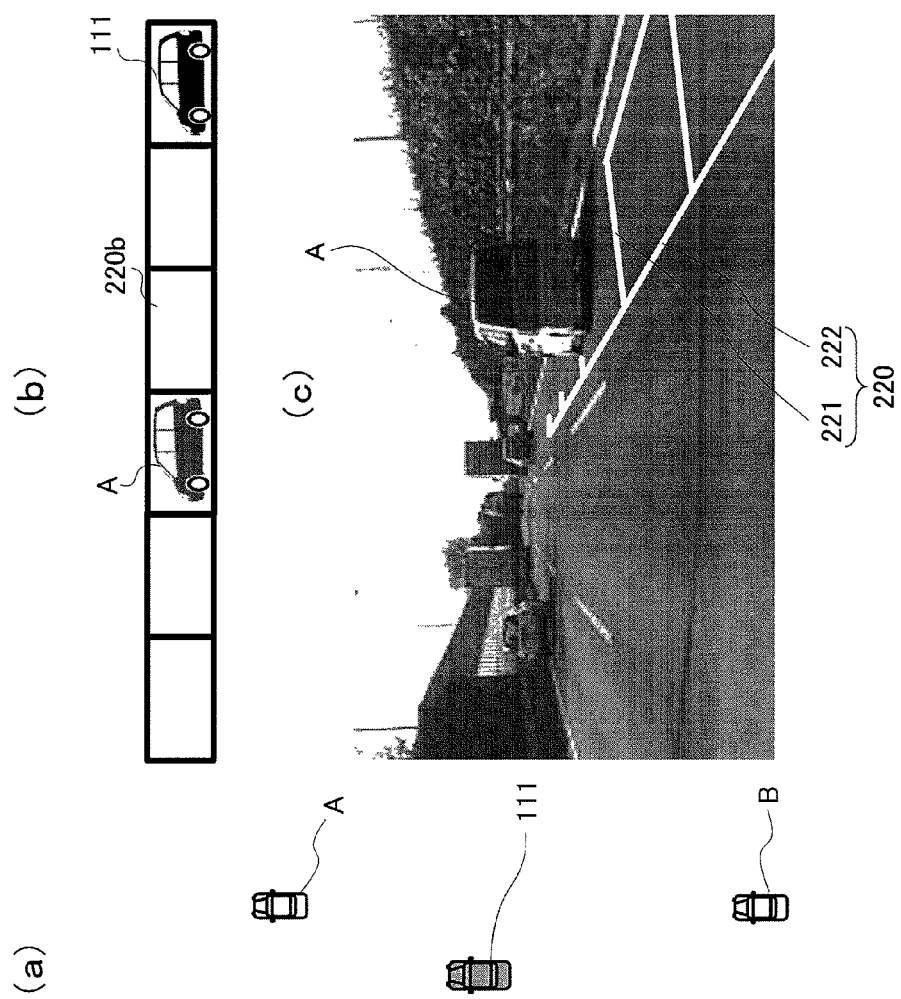
FIGS. 22A to 22C illustrate a creating process of a superimposed image of drive support apparatus according to Embodiment 5 and display examples of an image in which a superimposed image having a subject vehicle length as a reference unit of a distance has been synthesized.
Figure 23:
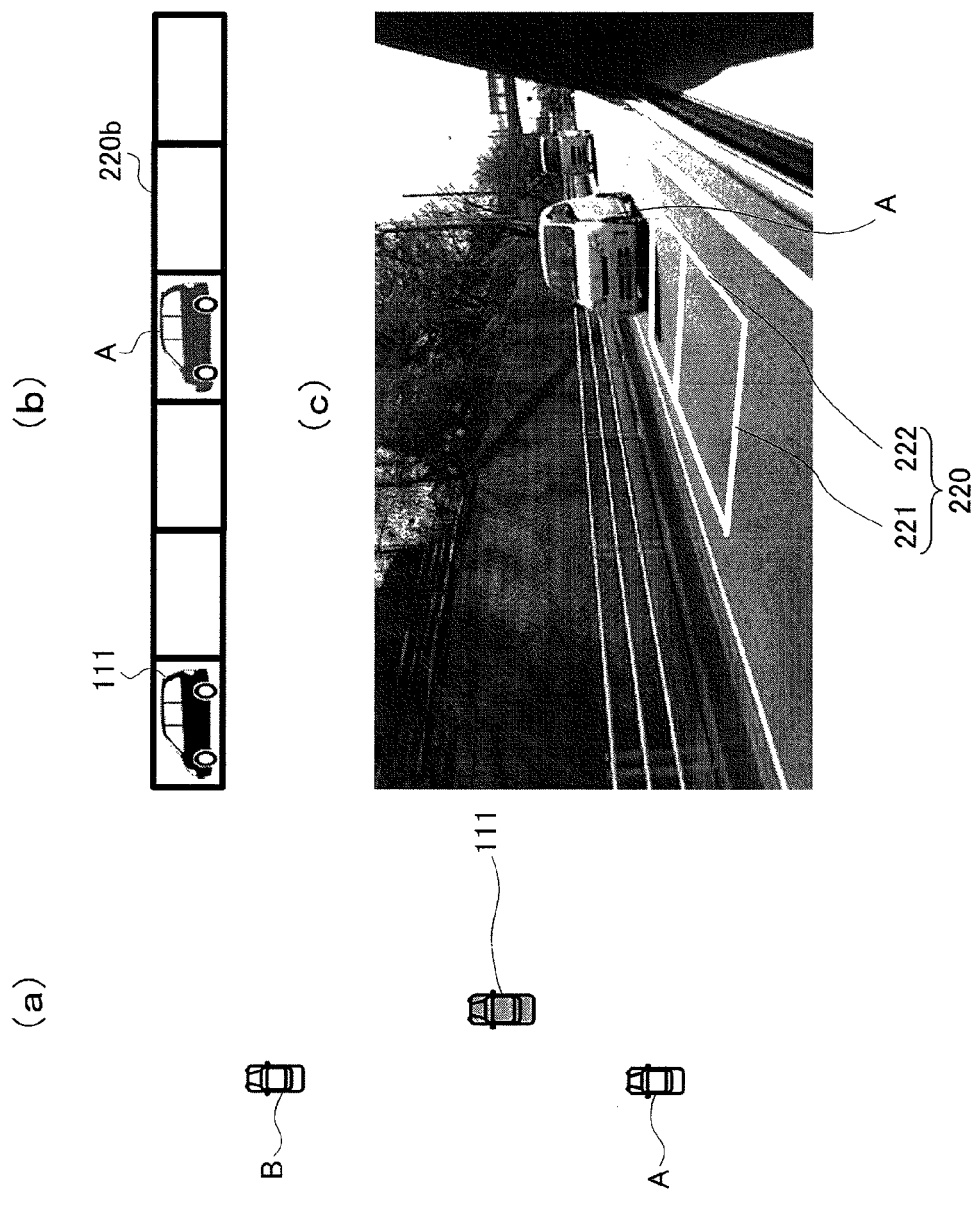
FIGS. 23A to 23C illustrate a creating process of a superimposed image of drive support apparatus according to Embodiment 5 and display examples of an image in which a superimposed image having a subject vehicle length as a reference unit of a distance has been synthesized.
Figure 24:
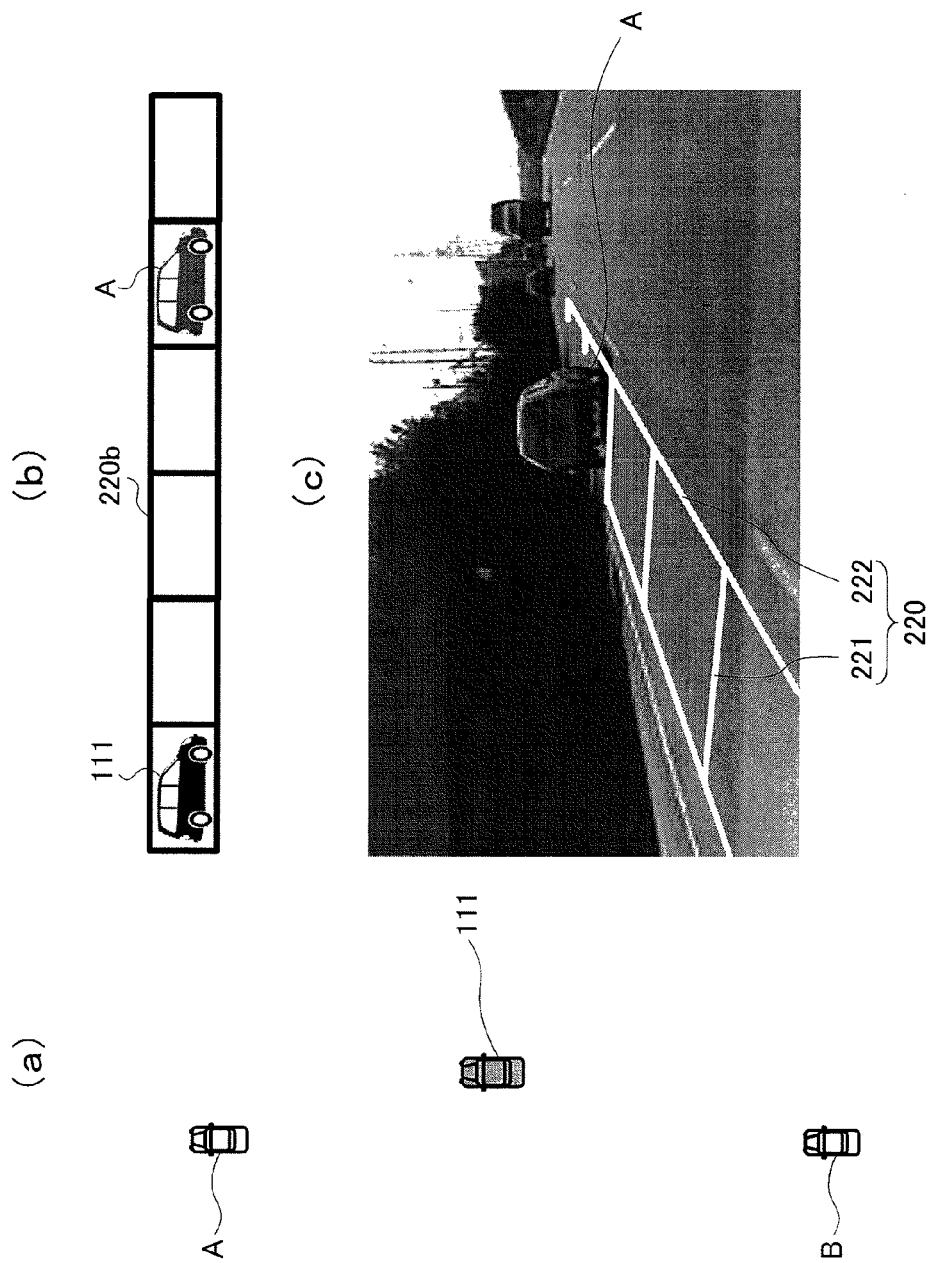
FIGS. 24A to 24C illustrate a creating process of a superimposed image of drive support apparatus according to Embodiment 5 and display examples of an image in which a superimposed image having a subject vehicle length as a reference unit of a distance has been synthesized.
Figure 25:
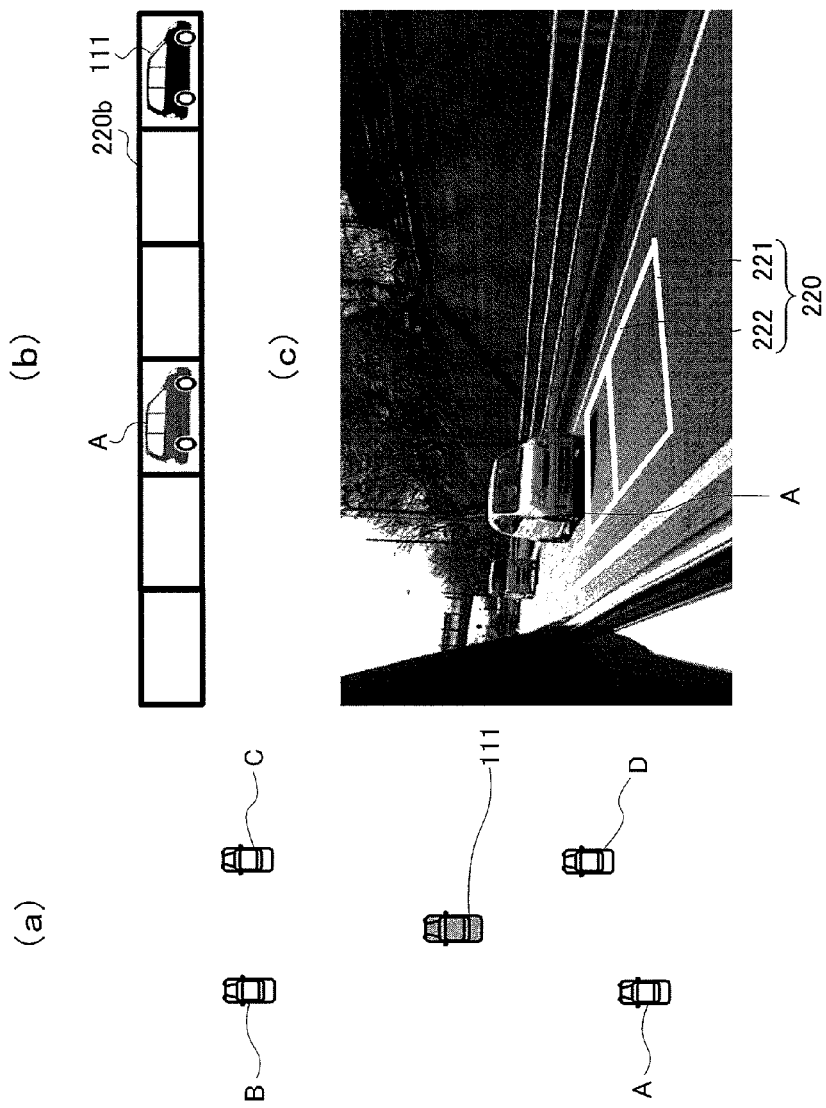
FIGS. 25A to 25C illustrate a creating process of a superimposed image of drive support apparatus according to Embodiment 5 and display examples of an image in which a superimposed image having a subject vehicle length as a reference unit of a distance has been synthesized.
Figure 26:
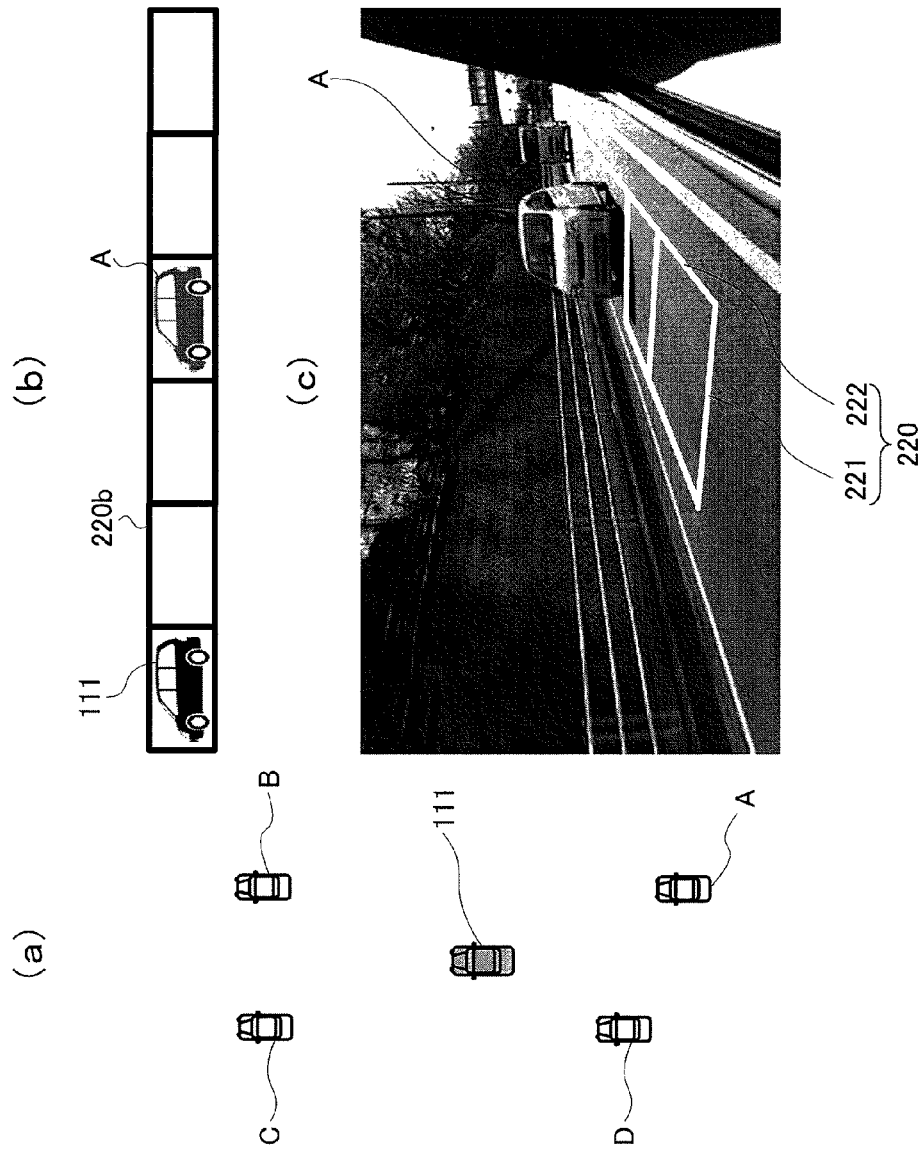
FIGS. 26A to 26C illustrate a creating process of a superimposed image of drive support apparatus according to Embodiment 5 and display examples of an image in which a superimposed image having a subject vehicle length as a reference unit of a distance has been synthesized.
Figure 27:
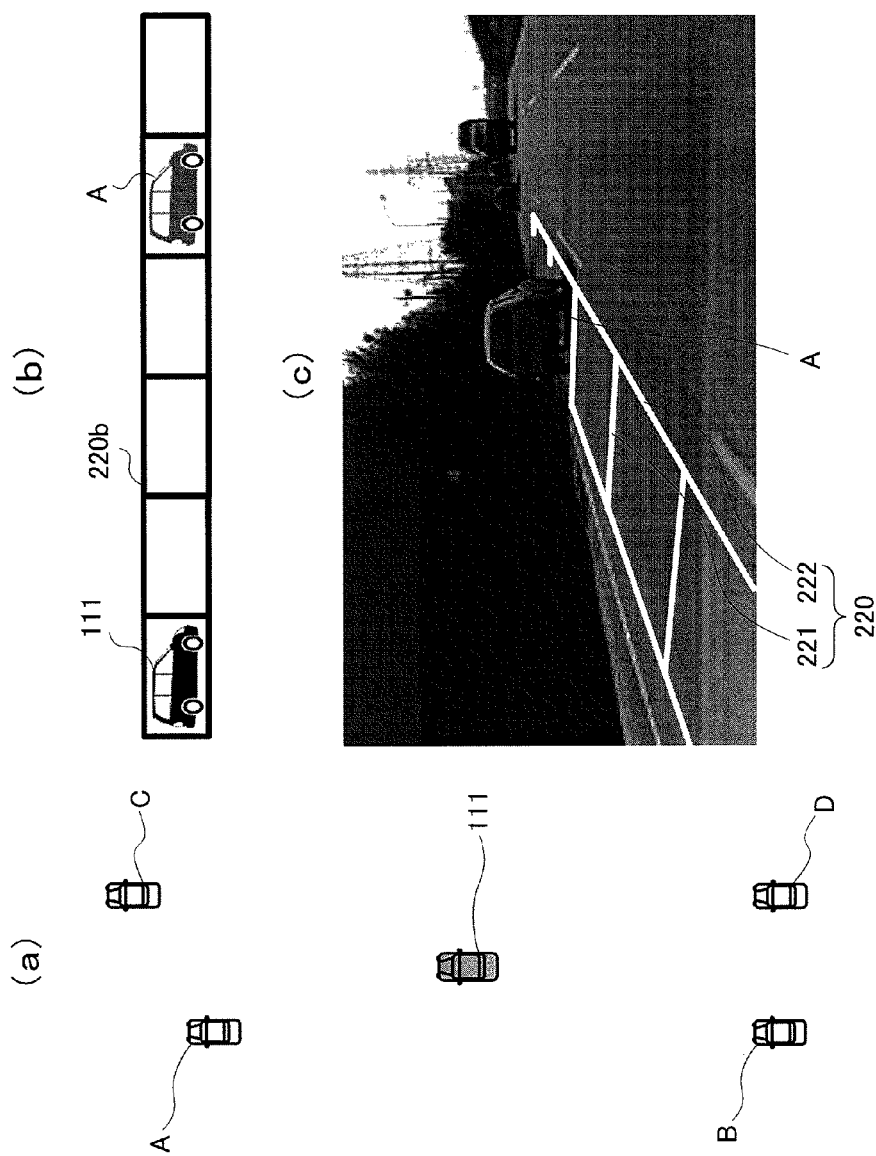
FIGS. 27A to 27C illustrate a creating process of a superimposed image of drive support apparatus according to Embodiment 5 and display examples of an image in which a superimposed image having a subject vehicle length as a reference unit of a distance has been synthesized.
Figure 28:
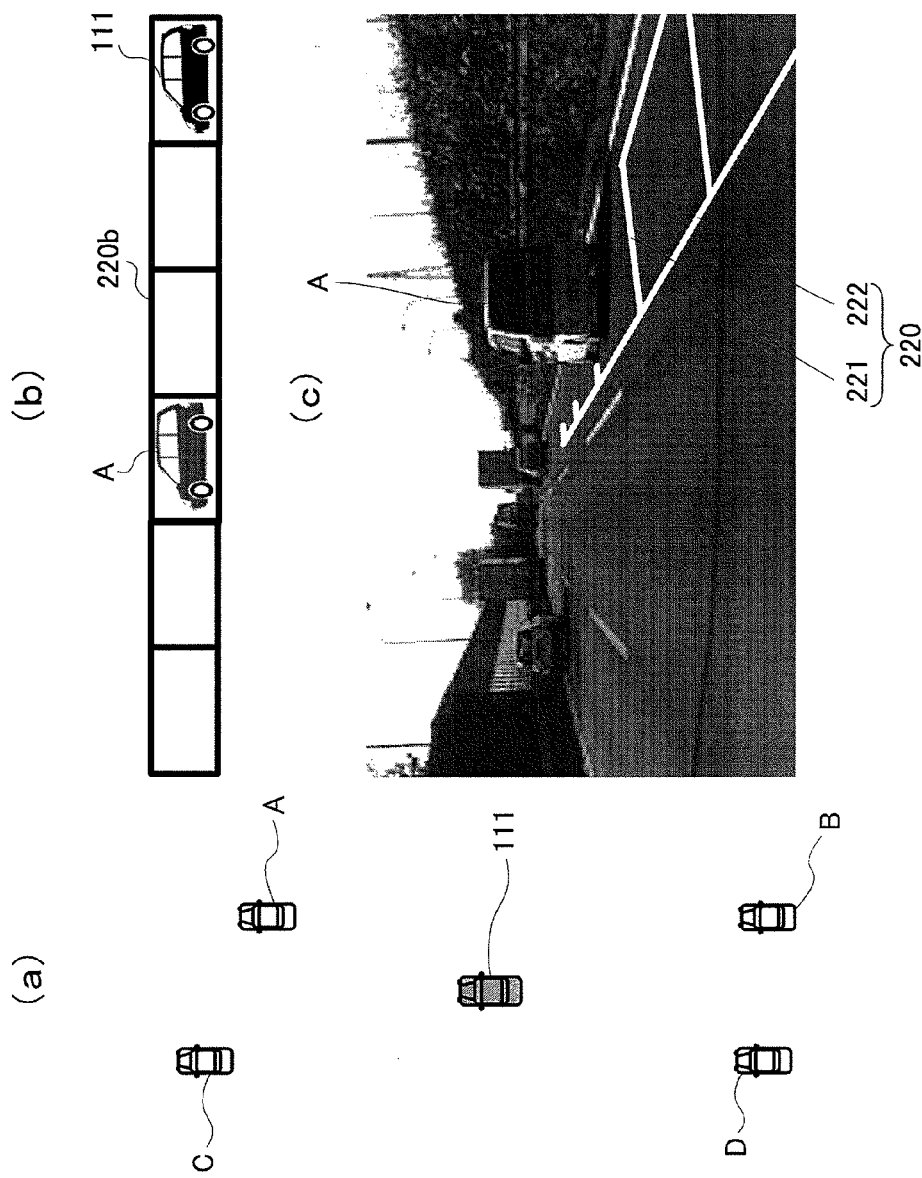
FIGS. 28A to 28C illustrate a creating process of a superimposed image of drive support apparatus according to Embodiment 5 and display examples of an image in which a superimposed image having a subject vehicle length as a reference unit of a distance has been synthesized.

FIG. 13 is a flowchart showing an operation of drive support apparatus 300. FIG. 14 is a flowchart showing an image generating process corresponding to imaging section 310 of the flow of FIG. 13. The same process steps as in FIG. 3 are denoted by the same reference numerals.

In step S31, drive support apparatus 300 executes the image generating process illustrated in FIG. 14 on a plurality of images around the vehicle captured by imaging section 310. For example, imaging section 310 generates an image on a plurality of images around the vehicle captured by a plurality of cameras (imaging sections 1, 2, . . . , and n).

In step S32, display image generating section 160 generates a display image corresponding to each superimposed image. In detail, display image generating section 160 synthesizes the superimposed image with the side rear image and generates the display image. When no vehicle is detected by vehicle detecting section 130, superimposed image generating section 140 does not generate any superimposed image. In this case, display image generating section 160 synthesizes the output of the superimposed image generating section 140 that has not generated anything with the side rear image. The result is the side rear image as it is.

In step S33, display image selecting section 340 judges an image having a vehicle that needs the greatest caution from among images 1, 2, . . . , and, n.

In detail, display image selecting section 340 selects, as a selection image, an image that satisfies a selection condition from among vehicle peripheral images transmitted from imaging section 310. For example, when a status around the vehicle is like FIGS. 15A to 15C through FIGS. 28A to 28C and the display image selection condition is "display a vehicle that is smallest in distance from the subject vehicle", since the distance of the vehicle at the right front is smallest, the mage 1 (an image 1 in which a vehicle in a right front direction is reflected is referred to as "image 1") is selected. A judgment condition by display image selecting section 340 is as follows:

Ex. 1) a vehicle whose distance from the subject vehicle is less than 10 meters, Ex. 2) a vehicle whose distance from the subject vehicle is less than 10 meters, a vehicle that is approaching at a relative speed of 2 m/s or more relative to the subject vehicle, or a vehicle whose distance from the subject vehicle is less than 5 meters, and Ex. 3) a vehicle having TTC of 5 s or less or a vehicle whose distance from the subject vehicle corresponds to three subject vehicle lengths or less. In step S34, display section 170 displays an image of a vehicle that needs the greatest caution selected by display image selecting section 340 and finishes the present flow.

When a lane change moment is used as a condition, in step S34, an image is selected based on the detection result of lane change detecting section 330.

The details of the image generating process of step S31 is illustrated in FIG. 14.

As illustrated in FIG. 14, in step S1, imaging section 110 acquires a stereo image at set timing and transmits the stereo image to distance measuring section 320 and display image selecting section 340. At this time, control of a gain according to the brightness of a field of view of imaging section 310 is performed. Particularly, when the wide-angle lens is used, since distortion of an image increases, correction of distortion according to an installation position, an angle of view, a direction, or the like of imaging section 310 may be performed.

In step S2, distance measuring section 320 measures the distance by generating a distance image based on the stereo image.

In step S3, vehicle detecting section 130 detects a vehicle (that is, another vehicle) based on the distance measuring result and checks whether or not a vehicle has been detected.

When a vehicle has been detected, in step S4, superimposed image generating section 140 calculates the distance of the subject vehicle length unit based on the subject vehicle length information stored in subject vehicle length information storage section 150 and the distance to other vehicles.

In step S5, superimposed image generating section 140 generates the superimposed image in which a maximum of ([N]+1) lines including a reference line of the subject vehicle's rear end are used, and the process returns to step S32 of FIG. 13.

When another vehicle is not detected in the image in step S3, in step S6, superimposed image generating section 140 does not generate any superimposed image, and the process proceeds to step S32.

As described above, the processing flow is performed in consideration of detection of a vehicle around the subject vehicle as well as the side rear image of the subject vehicle.

FIGS. 15A to 15C through FIGS. 28A to 28C illustrate a creating process of a superimposed image of drive support apparatus 300 and display examples of an image in which the superimposed image having the subject vehicle length as the reference unit of the distance has been synthesized.

FIGS. 15A to 28A illustrate a status around the subject vehicle in which drive support apparatus 300 is mounted. FIGS. 15B to 28B illustrate examples of the superimposed image of drive support apparatus 300. FIGS. 15C to 28C illustrate examples of the display image synthesized by display image generating section 160 of drive support apparatus 300.

FIGS. 15A to 15C and FIGS. 16A to 16C illustrate examples of cases in which vehicles are present at the left and right rear positions of the subject vehicle.

FIGS. 17A to 17C illustrate an example of a case where a vehicle is present at the right front position of the subject vehicle.

FIGS. 18A to 18C illustrate an example of a case where a vehicle is present at the left position of the subject vehicle.

FIGS. 19A to 19C illustrate an example of a case where a vehicle is present at the left front and right front positions of the subject vehicle, and the vehicle at the left front position is closest.

FIGS. 20A to 20C illustrate an example of a case where vehicles are present at the left front and right front positions of the subject vehicle, and the vehicle at the right front position is closest.

FIGS. 21A to 21C illustrate an example of a case where vehicles are present at the right front and right rear positions of the subject vehicle, and the vehicle at the left rear position is closest.

FIGS. 22A to 22C illustrate an example of a case where vehicles are present at the right front and right rear positions of the subject vehicle, and the vehicle at the right front position is closest.

FIGS. 23A to 23C illustrate an example of a case where vehicles are present at the left front and left rear positions of the subject vehicle, and the vehicle at the left rear position is closest.

FIGS. 24A to 24C illustrate an example of a case where vehicles are present at the left front and left rear positions of the subject vehicle, and the vehicle at the left front position is closest.

FIGS. 25A to 25C illustrate an example of a case where vehicles are present at the left and right front and rear positions of the subject vehicle, and the vehicle at the left rear position is closest.

FIGS. 26A to 26C illustrate an example of a case where vehicles are present at the left and right front and rear positions of the subject vehicle, and the vehicle at the right rear position is closest.

FIGS. 27A to 27C illustrates an example of a case where vehicles are present at the left and right front and rear positions of the subject vehicle, and the vehicle at the left front position is closest.

FIGS. 28A to 28C illustrates an example of a case where vehicles are present at the left and right front and rear positions of the subject vehicle, and the vehicle at the right front position is closest.

For example, referring to FIGS. 28A to 28C, when other vehicles A, B, C, and D are present at the left and right front and left positions of subject vehicle 111, if imaging section 310 acquires a plurality of images around subject vehicle 111, vehicle detecting section 130 detects other vehicles A, B, C, and D present inside the distance image generated by distance measuring section 320.

Superimposed image generating section 140 calculates the distance of the subject vehicle length unit based on the subject vehicle length information stored in subject vehicle length information storage section 150 and the distances to other vehicles A, B, C, and D detected by distance measuring section 320 and generates the superimposed image based on the calculated distance.

Display image selecting section 340 selects, as a selection image, an image that satisfies the selection condition from among vehicle peripheral images transmitted from imaging section 310. For example, when a status around subject vehicle 111 is like FIGS. 28A to 28C and the display image selection condition is "display a vehicle that is smallest in distance from the subject vehicle", since the distance of another vehicle A at the right front is smallest, a superimposed image illustrated in FIG. 28B is created, and a synthetic image illustrated in FIG. 28C is displayed.

In the present embodiment, the same effects as in Embodiments 1 to 4 are obtained. That is, the driver can intuitively recognize how far other vehicles are behind away from the subject vehicle or how fast other vehicles are approaching by the subject vehicle length unit. Since the distance between the subject vehicle length and another vehicle can be instantly recognized, it is prevented to misunderstand the distance, for example, at the time of high speed traveling, and thus a possibility of an accident can be prevented.

Examples of preferred embodiments of the present invention have been described above, but the scope of the present invention is not limited thereto.

For example, in the above embodiments, the stereo camera has been used to measure the distance. However, the present invention is not limited to the stereo camera, and a system may be configured by combining vehicle detecting means with another distance measuring means such as a monocular camera or a millimeter wave.

Further, in the above embodiments, the side rear image in a direction of the winker that is turned on according to the driver's winker operation timing may be displayed, or the side rear image may be superimposed on the superimposed image and then displayed.

Further, in the above embodiments, depending on the distance to other vehicles, for example, as the distance gets closer, the color of the superimposed image may sequentially change to the color such as blue, yellow, and red. Further, the relative speed of other vehicles may be calculated based on a temporal change of the distance of another vehicle, and depending on the relative speed of other vehicles, for example, as the relative speed increases, the color of the superimposed image may sequentially change to the color such as blue, yellow, and red. Further, a degree of urgency can be conveyed by changing the color of the superimposed image similarly by a combination of the distance and the relative speed.

Further, in the above embodiments, a maximum of the number of frames to display may change according to the magnitude of the relative speed of other vehicles. For example, when the relative speed of other vehicles relative to the subject vehicle is less than 10 km/h, a maximum of five frames may be used, and when the relative speed of other vehicles is 10 km/h or more and less than 30 km/h, a maximum of seven frames may be used.

Further, in the above embodiment, suggestion combined with, for example, sound, voice information, or vibration by another information suggesting means may be performed. Further, a meter display can be used together.

Further, in the present embodiment, a title of drive support apparatus and driving support method has been used. However, this is for convenience of description, and the device may include a driving support system or an electronic mirror system, and the method may include vehicle information display method or the like.

Further, the types of the components that configure drive support apparatus such as distance measuring unit, the vehicle detecting method of vehicle detecting section, the superimposed image generating method of superimposed image generating section, and the like are not limited to the above described embodiments.

The driving support method described above is implemented even by a program for executing the driving support method. This program is stored in a computer readable recording medium.

The disclosure of Japanese Patent Application No. 2009-105305, filed on Apr. 23, 2009, including the specification, drawings and abstract, is incorporated herein by reference in its entirety.

INDUSTRIAL APPLICABILITY

The drive support apparatus and driving support method according to the present invention are useful as an electronic mirror system that presents the driver with an image of a side rear area of a vehicle captured by a camera. Further, the present invention can be applied for use in drive support apparatuses of all vehicles.

REFERENCE SIGNS LIST 100, 300 Drive support apparatus
110, 310 Imaging section
120, 320 Distance measuring section
130 Vehicle detecting section
140 Superimposed image generating section
150 Subject vehicle length information storage section
160 Display image generating section
170 Display section
330 Lane change detecting section
340 Display image selecting section

The invention claimed is:

1. A drive support apparatus that is mounted on a subject vehicle, the apparatus comprising:
    an imager that captures a side peripheral image of the subject vehicle;
    a vehicle detector that detects other vehicles in the captured side peripheral image;
    a distance detector that detects distances between the subject vehicle and the other vehicles;
    a subject vehicle length information storage that stores an entire length of the subject vehicle as subject vehicle length information;
    a superimposed image generator that calculates a distance of a subject vehicle length unit based on the subject vehicle length information stored in the subject vehicle length information storage and the distances from the subject vehicle to the other vehicles detected by the distance detector, and generates a superimposed image based on the calculated distance;
    a display image generator that synthesizes the superimposed image generated by the superimposed image generator on the captured side peripheral image, and generates a display image; and
    a display in the subject vehicle and displays the display image generated by the display image generator,
    wherein the superimposed image generator generates the superimposed image including a concatenation of frames configured with a line segment parallel to a width direction of a road and a line segment parallel to a road direction, and
    the superimposed image generator makes each of the frames have a length along the road direction corresponding to the entire length of the subject vehicle on the basis of the subject vehicle length information.

2. The drive support apparatus according to claim 1, wherein the side peripheral image of the subject vehicle includes at least one of a side rear image and a side front image of the subject vehicle.

3. The drive support apparatus according to claim 1, wherein the superimposed image generator generates the superimposed image including the concatenation of frames drawn on a road surface of a lane adjacent to a present lane on the side peripheral image.

4. The drive support apparatus according to claim 1, wherein the superimposed image generator generates the superimposed image including the concatenation of a predetermined number of frames which are lined rearward starting from a position of a rear end of the subject vehicle in the side peripheral image.

5. The drive support apparatus according to claim 1, wherein the superimposed image generator generates the superimposed image including the concatenation of frames when the distances from the subject vehicle to the other vehicles are included within a distance represented by the concatenation of frames.

6. The drive support apparatus according to claim 1, wherein the superimposed image generator generates the frames only in a region ahead of the other vehicles, as the superimposed image.

7. The drive support apparatus according to claim 1, wherein the superimposed image generator generates, in a region farther than the other vehicles, only a connection portion of a first line segment that is parallel to a width direction of a road and at a side close to a present lane, and a second line segment that is connected to and perpendicular to the first line segment, as a part of the superimposed image.

8. The drive support apparatus according to claim 1, wherein the superimposed image generator further generates another superimposed image that has compartments and symbols, each of the compartments having a length corresponding to the subject vehicle length unit and including a first line segment viewed in a vehicle traverse direction, the symbols representing the subject vehicle and the other vehicles and being displayed on the first line segment.

9. The drive support apparatus according to claim 1, wherein
    when a front end of an other vehicle is not ahead of a rear end of the subject vehicle, the superimposed image generator further generates a first superimposed image that has compartments and symbols, each of the compartments having a length corresponding to the subject vehicle length unit and including a first line segment viewed in a vehicle traverse direction, the symbols representing the subject vehicle and the other vehicle displayed on the first line segment; and
    when the front end of the other vehicle is ahead of a rear end of the subject vehicle, the superimposed image generator generates a second superimposed image, which is different from the first superimposed image, and in which the symbols of the other vehicles are not displayed and the symbol of the subject vehicle is highlighted.

10. The drive support apparatus according to claim 1, further comprising a display image selector that selects an image to be displayed on the display, based on a predetermined selection condition, from a plurality of images captured by the imager.

11. The drive support apparatus according to claim 10, wherein the selection condition includes information based on a distance from the subject vehicle, a relative speed relative to the subject vehicle, and time to collision (TTC).

12. A driving support method that supports a driver to drive a subject vehicle, the method comprising:

capturing a side peripheral image of the subject vehicle;

detecting other vehicles in the captured side peripheral image;

detecting distances between the subject vehicle and the other vehicles;

storing an entire length of the subject vehicle as subject vehicle length information in advance;

calculating a distance of a subject vehicle length unit based on the subject vehicle length information and the detected distances from the subject vehicle to the other vehicles;

generating a superimposed image based on the calculated distance;

synthesizing the generated superimposed image on the captured side peripheral image and generating the display image; and displaying the generated display image, wherein the generating generates the superimposed image including a concatenation of frames configured with a line segment parallel to a width direction of a road and a line segment parallel to a road direction, and the generating makes each of the frames have a length along the road direction corresponding to the entire length of the subject vehicle on the basis of the subject vehicle length information.

13. A non-transitory computer-readable recording medium that stores a program causing a computer to execute the driving support method according to claim 12.

* * * * *